(12) United States Patent
Kummetz et al.

(10) Patent No.: US 10,841,923 B2
(45) Date of Patent: *Nov. 17, 2020

(54) DIGITAL BASEBAND TRANSPORT IN TELECOMMUNICATIONS DISTRIBUTION SYSTEMS

(71) Applicant: CommScope Technologies LLC, Hickory, NC (US)

(72) Inventors: Thomas Kummetz, Kissing, DE (US); Fred William Phillips, Forest, VA (US); Christopher Goodman Ranson, Concord, VA (US); Van E. Hanson, Forest, VA (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/973,069

(22) Filed: May 7, 2018

(65) Prior Publication Data

US 2018/0255554 A1 Sep. 6, 2018

Related U.S. Application Data

(63) Continuation of application No. 15/283,948, filed on Oct. 3, 2016, now Pat. No. 9,967,885, which is a
(Continued)

(51) Int. Cl.
*H04W 72/04* (2009.01)
*H04L 25/05* (2006.01)
(Continued)

(52) U.S. Cl.
CPC ........ *H04W 72/0453* (2013.01); *H04B 1/001* (2013.01); *H04L 1/00* (2013.01);
(Continued)

(58) Field of Classification Search
CPC .... H04W 72/0453; H04W 72/02; H04L 1/00; H04L 25/05
See application file for complete search history.

(56) References Cited

U.S. PATENT DOCUMENTS

| 4,922,257 A | 5/1990 | Saito et al. |
| 4,947,133 A | 8/1990 | Thomas |

(Continued)

FOREIGN PATENT DOCUMENTS

| CN | 1263384 A | 8/2000 |
| CN | 1274213 A | 11/2000 |

(Continued)

OTHER PUBLICATIONS meriam-webster.com, "Interface", Interface Definition of Interface by http://www.Meriam-Webster.com/dictionary/interface,Oct. 12, 2015, pp. 13.

(Continued)

*Primary Examiner* — Rasheed Gidado
(74) *Attorney, Agent, or Firm* — Fogg & Powers LLC

(57) ABSTRACT

A method includes: receiving downlink signals at a head end unit of a distributed antenna system from at least one base station; processing the downlink signals into downlink channelized digital baseband signals at the head end unit by at least one of channel filtering, interpolating, and mixing with an oscillator, the downlink channelized digital baseband signals including call information for wireless communication; formatting the downlink channelized digital baseband signals for transport together at the head end unit; packetizing and packet scheduling the downlink channelized digital baseband signals into downlink packetized baseband signals at the head end unit; and transmitting the downlink packetized baseband signals from the head end unit to remotely located units of the distributed antenna system.

20 Claims, 20 Drawing Sheets

Related U.S. Application Data continuation of application No. 14/536,012, filed on Nov. 7, 2014, now Pat. No. 9,462,603, which is a continuation of application No. 13/833,188, filed on Mar. 15, 2013, now Pat. No. 8,908,607.

(60) Provisional application No. 61/751,982, filed on Jan. 14, 2013, provisional application No. 61/720,620, filed on Oct. 31, 2012.

(51) Int. Cl.
| | | |
|---|---|---|
| *H04L 1/00* | (2006.01) | |
| *H04B 1/00* | (2006.01) | |
| *H04L 27/00* | (2006.01) | |
| *H04W 72/12* | (2009.01) | |
| *H04W 72/02* | (2009.01) | |
| *H04W 88/08* | (2009.01) | |

(52) U.S. Cl.
CPC .......... *H04L 25/05* (2013.01); *H04L 27/0002* (2013.01); *H04W 72/042* (2013.01); *H04W 72/0413* (2013.01); *H04W 72/1263* (2013.01); *H04W 72/02* (2013.01); *H04W 88/085* (2013.01)

(56) References Cited

U.S. PATENT DOCUMENTS

| | | |
|---|---|---|
| 5,191,598 A | 3/1993 | Baeckstroem et al. |
| 5,257,415 A | 10/1993 | Kumagai et al. |
| 5,280,472 A | 1/1994 | Gilhousen et al. |
| 5,396,522 A | 3/1995 | Laflin |
| 5,579,341 A | 11/1996 | Smith et al. |
| 5,603,080 A | 2/1997 | Kaellander et al. |
| 5,621,786 A | 4/1997 | Fischer et al. |
| 5,677,860 A | 10/1997 | Yazawa et al. |
| 5,719,867 A | 2/1998 | Borazjani |
| 5,852,651 A | 12/1998 | Fischer et al. |
| 5,854,986 A | 12/1998 | Dorren et al. |
| 5,856,804 A | 1/1999 | Turcotte et al. |
| 5,867,763 A | 2/1999 | Dean et al. |
| 5,903,834 A | 5/1999 | Wallstedt et al. |
| 5,926,476 A | 7/1999 | Ghaibeh |
| 5,940,384 A | 8/1999 | Carney et al. |
| 5,940,451 A | 8/1999 | Kim |
| 5,978,365 A | 11/1999 | Yi |
| 6,028,850 A | 2/2000 | Kang |
| 6,147,786 A | 11/2000 | Pan |
| 6,167,099 A | 12/2000 | Rader et al. |
| 6,178,194 B1 | 1/2001 | Vasic |
| 6,205,133 B1 | 3/2001 | Bexten |
| 6,247,035 B1 | 6/2001 | Hellberg |
| 6,282,184 B1 | 8/2001 | Lehman et al. |
| 6,307,877 B1 | 10/2001 | Philips et al. |
| 6,348,874 B1 | 2/2002 | Cole et al. |
| 6,434,187 B1 | 8/2002 | Beard et al. |
| 6,539,239 B1 | 3/2003 | Loughran et al. |
| 6,577,686 B1 | 6/2003 | Koga et al. |
| 6,603,806 B2 | 8/2003 | Martone |
| 6,650,649 B1 | 11/2003 | Muhammad et al. |
| 6,697,603 B1 | 2/2004 | Lovinggood et al. |
| 6,704,545 B1 | 3/2004 | Wala |
| 6,724,834 B2 | 4/2004 | Garrett et al. |
| 6,731,678 B1 | 5/2004 | White et al. |
| 6,771,933 B1 | 8/2004 | Eng et al. |
| 6,785,558 B1 | 8/2004 | Stratford et al. |
| 6,801,767 B1 | 10/2004 | Schwartz et al. |
| 6,864,818 B1 | 3/2005 | Hezar |
| 6,920,127 B2 | 7/2005 | Ozluturk et al. |
| 6,930,990 B2 | 8/2005 | Dajer et al. |
| 6,963,552 B2 | 11/2005 | Sabat, Jr. et al. |
| 6,980,774 B2 | 12/2005 | Shi |
| 7,013,087 B2 | 3/2006 | Suzuki et al. |
| 7,020,451 B2 | 3/2006 | Sugar et al. |
| 7,035,671 B2 | 4/2006 | Solum |
| 7,039,399 B2 | 5/2006 | Fischer |
| 7,058,037 B1 | 6/2006 | Moon |
| 7,062,246 B2 | 6/2006 | Owen |
| 7,072,586 B2 | 7/2006 | Aburakawa et al. |
| 7,075,903 B1 | 7/2006 | Solum |
| 7,079,599 B2 | 7/2006 | Karaoguz |
| 7,088,794 B2 | 8/2006 | Nichols |
| 7,151,740 B2 | 12/2006 | Zhang et al. |
| 7,155,176 B2 | 12/2006 | Komaili et al. |
| 7,171,244 B2 | 1/2007 | Bauman |
| 7,184,728 B2 | 2/2007 | Solum |
| 7,194,049 B2 | 3/2007 | Dhalla et al. |
| 7,230,957 B2 | 6/2007 | Kang et al. |
| 7,352,310 B2 | 4/2008 | Mori et al. |
| 7,356,075 B2 | 4/2008 | Bergstrom et al. |
| 7,359,392 B2 | 4/2008 | Bianchi et al. |
| 7,388,931 B1 | 6/2008 | Hsu et al. |
| 7,394,870 B2 | 7/2008 | Chien et al. |
| 7,403,556 B2 | 7/2008 | Kao et al. |
| 7,433,347 B1 | 10/2008 | Trott et al. |
| 7,450,911 B1 | 11/2008 | Venkatesh |
| 7,483,678 B2 | 1/2009 | Rozenblit et al. |
| 7,508,890 B1 | 3/2009 | Malone et al. |
| 7,515,929 B2 | 4/2009 | Ramachandran et al. |
| 7,539,509 B2 | 5/2009 | Bauman et al. |
| 7,565,125 B2 | 7/2009 | Audinot et al. |
| 7,565,170 B2 | 7/2009 | Buscaglia et al. |
| 7,573,410 B1 | 8/2009 | Georgantas et al. |
| 7,573,862 B2 | 8/2009 | Chambers et al. |
| 7,583,765 B2 | 9/2009 | Beamish |
| 7,610,046 B2 | 10/2009 | Wala |
| 7,630,296 B2 | 12/2009 | Zavadsky et al. |
| 7,639,982 B2 | 12/2009 | Wala |
| 7,668,153 B2 | 2/2010 | Zavadsky |
| 7,688,776 B2 | 3/2010 | Sexton et al. |
| 7,688,923 B2 | 3/2010 | Capretta |
| 7,702,291 B2 | 4/2010 | Hansen |
| 7,760,816 B2 | 7/2010 | Sobchak et al. |
| 7,761,093 B2 | 7/2010 | Sabat, Jr. et al. |
| 7,787,854 B2 | 8/2010 | Conyers et al. |
| 7,805,073 B2 | 9/2010 | Sabat, Jr. et al. |
| 7,835,327 B2 | 11/2010 | Hahm et al. |
| 7,848,731 B1 | 12/2010 | Dianda et al. |
| 7,848,770 B2 | 12/2010 | Scheinert |
| 7,860,188 B2 | 12/2010 | Jensen |
| 7,885,355 B2 | 2/2011 | Perraud et al. |
| 7,885,357 B1 | 2/2011 | Kuo et al. |
| 7,974,244 B2 | 7/2011 | Hermel |
| 7,991,013 B2 | 8/2011 | Gupta et al. |
| 8,005,152 B2 | 8/2011 | Wegener |
| 8,036,617 B2 | 10/2011 | Olgaard |
| 8,050,237 B2 | 11/2011 | Kong et al. |
| 8,126,420 B2 | 2/2012 | Koroglu et al. |
| 8,135,102 B2 | 3/2012 | Wiwel et al. |
| 8,160,022 B2 | 4/2012 | Mazawa et al. |
| 8,174,428 B2 | 5/2012 | Wegener |
| 8,213,401 B2 | 7/2012 | Fischer et al. |
| 8,254,481 B1 | 8/2012 | McCloskey et al. |
| 8,260,143 B2 | 9/2012 | Gupta et al. |
| 8,260,279 B2 | 9/2012 | Kiasaleh et al. |
| 8,270,387 B2 | 9/2012 | Cannon et al. |
| 8,270,502 B2 | 9/2012 | Lai |
| 8,306,563 B2 | 11/2012 | Zavadsky et al. |
| 8,315,293 B2 | 11/2012 | Wenzel et al. |
| 8,320,433 B2 | 11/2012 | Wegener |
| 8,385,483 B2 | 2/2013 | Abdelmonem et al. |
| 8,626,245 B2 | 1/2014 | Zavadsky et al. |
| 8,724,664 B2 | 5/2014 | Stapleton et al. |
| 8,885,652 B2 | 11/2014 | Dai |
| 8,908,607 B2 | 12/2014 | Kummetz et al. |
| 9,055,472 B2 | 6/2015 | Evans et al. |
| 9,462,603 B2 | 10/2016 | Kummetz et al. |
| 9,967,885 B2 | 5/2018 | Kummetz et al. |
| 2001/0031646 A1 | 10/2001 | Williams |
| 2002/0154687 A1 | 10/2002 | Bierly et al. |
| 2003/0182524 A1 | 9/2003 | Tsuchiya |
| 2004/0004943 A1 | 1/2004 | Kim et al. |
| 2004/0106435 A1 | 6/2004 | Bauman et al. |

(56) References Cited

U.S. PATENT DOCUMENTS

| | | | |
|---|---|---|---|
| 2004/0132474 A1 | 7/2004 | Wala | |
| 2005/0233715 A1 | 10/2005 | Laroia et al. | |
| 2005/0259724 A1 | 11/2005 | Bergstrom et al. | |
| 2006/0063490 A1 | 3/2006 | Bader et al. | |
| 2006/0172775 A1 | 8/2006 | Conyers et al. | |
| 2006/0223468 A1 | 10/2006 | Toms et al. | |
| 2007/0008939 A1 | 1/2007 | Fischer | |
| 2007/0027943 A1 | 2/2007 | Jensen et al. | |
| 2007/0086544 A1 | 4/2007 | Fudge et al. | |
| 2007/0149158 A1 | 6/2007 | Brobston et al. | |
| 2007/0195905 A1 | 8/2007 | Schatz | |
| 2007/0238457 A1 | 10/2007 | Wala | |
| 2008/0069032 A1 | 3/2008 | Liu | |
| 2008/0181171 A1 | 7/2008 | Koziy et al. | |
| 2008/0181282 A1 | 7/2008 | Wala et al. | |
| 2008/0219292 A1* | 9/2008 | Wang | H04L 5/06 370/484 |
| 2008/0232305 A1 | 9/2008 | Oren et al. | |
| 2008/0240164 A1 | 10/2008 | Zavadsky | |
| 2008/0240225 A1 | 10/2008 | Zavadsky et al. | |
| 2009/0040107 A1 | 2/2009 | Yun et al. | |
| 2009/0075644 A1 | 3/2009 | Hermel | |
| 2009/0149221 A1* | 6/2009 | Liu | H04W 88/085 455/561 |
| 2009/0290632 A1 | 11/2009 | Wegener | |
| 2010/0056201 A1 | 3/2010 | Akamine et al. | |
| 2010/0095323 A1* | 4/2010 | Williamson | H04H 20/30 725/32 |
| 2010/0130153 A1 | 5/2010 | Khoini-Poorfard et al. | |
| 2010/0135674 A1 | 6/2010 | Hermel | |
| 2010/0178936 A1 | 7/2010 | Wala et al. | |
| 2010/0208777 A1* | 8/2010 | Ogaz | H04L 12/2838 375/219 |
| 2010/0278530 A1 | 11/2010 | Kummetz et al. | |
| 2011/0135308 A1 | 6/2011 | Tarlazzi et al. | |
| 2011/0237210 A1 | 9/2011 | Jung et al. | |
| 2011/0268033 A1 | 11/2011 | Boldi et al. | |
| 2011/0310941 A1 | 12/2011 | Kenington | |
| 2011/0310948 A1 | 12/2011 | Ramesh et al. | |
| 2012/0014421 A1 | 1/2012 | Wegener | |
| 2012/0039254 A1 | 2/2012 | Stapleton et al. | |
| 2012/0039320 A1 | 2/2012 | Lemson et al. | |
| 2012/0176966 A1* | 7/2012 | Ling | H04B 1/40 370/328 |
| 2012/0184268 A1 | 7/2012 | Sabat et al. | |
| 2012/0250740 A1 | 10/2012 | Ling | |
| 2012/0309328 A1* | 12/2012 | Morrison | H04B 1/525 455/78 |
| 2012/0328041 A1* | 12/2012 | Chen | H04L 27/364 375/285 |
| 2013/0003658 A1 | 1/2013 | Stewart et al. | |
| 2013/0310023 A1 | 11/2013 | Bevan et al. | |

FOREIGN PATENT DOCUMENTS

| | | |
|---|---|---|
| CN | 1469554 A | 1/2004 |
| CN | 102405627 A | 4/2012 |
| DE | 19833967 A1 | 2/2000 |
| EP | 0664621 A1 | 7/1995 |
| KR | 1020110108362 A | 10/2011 |
| WO | 9840968 A2 | 9/1998 |
| WO | 9952308 A1 | 10/1999 |
| WO | 2006135139 A1 | 12/2006 |
| WO | 2012024349 A1 | 2/2012 |
| WO | 2012054553 A1 | 4/2012 |
| WO | 2012087206 A1 | 6/2012 |
| WO | 2014070236 A1 | 5/2014 |

OTHER PUBLICATIONS

Advanced Mobile Phone Service, Inc., "Cellular Mobile Telephone Equipment Specification", Advanced Mobile Phone Service, Inc., Oct. 1983, pp. 1-2.

Abdul Hadi Al-Sayed et al., "Reconfigurable Baseband Blocks for Wireless Multistandard Transceivers", Department of Electrical and Computer Engineering Faculty of Engineering and Architecture American University of Beirut Spring 2005-2006, May 23, 2006, pp. 1-99, American University of Beirut.

Ariyavisitakul, et al., "Performance of Simulcast Wireless Techniques for Personal Communication Systems", IEEE Journal on Selected Areas in Communications vol. 14, No. 4, May 1996, pp. 632-643, IEEE.

Canadian Intellectual Property Office, "Office Action from CA Application No. 2,885,238 dated Jan. 11, 2019", from Foreign Counterpart to U.S. Appl. No. 13/833,188, pp. 13, Published: CA.

EIA Interim Standard, "Recommended Minimum Standards for 800-MHZ Cellular Subscriber Units", Electronic Industries Association—Engineering Department, May 1988, pp. 1-4.

EIA/TIA, "Mobile Station—Land Station Compatibility Specification", Electronic Industries Association EIA/TIA-553, Sep. 1989, pp. 1-2.

Enden et al., "Digitale Signalverarbeitung", Springer Fachmedien Wiesbaden, 1990, pp. 1-191, Published in: DE.

"CPRI Specification V1.4: Common Public Radio Interface (CPRI); Interface Specification", Mar. 31, 2006, pp. 1-64, Ericsson AB, Huawei Technologies Co. Ltd, NEG Corporation, Nortel Networks Ltd, and Siemens AG.

Ericsson, "CPRI Specification V4.0—Common Public Radio Interface (CPRI); Interface Specification", Ericsson AB, Huawei Technologies Co. Ltd., Jun. 30, 2008, pp. 1-96, Published in: US.

European Patent Office, "Communication pursuant to Article 94(3) from EP Application No. 17191611.7", from Foreign Counterpart to U.S. Appl. No. 13/833,188, dated Nov. 6, 2018, pp. 1-5, Published: EP.

European Patent Office, "Communication under Rule 71(3) from EP Application No. 13850111.9", from Foreign Counterpart to U.S. Appl. No. 13/833,188, dated Apr. 13, 2017, pp. 1-65, Published: EP.

European Patent Office, "Extended European Search Report from EP Application No. 13850111.9", from Foreign Counterpart to U.S. Appl. No. 13/833,188, dated Jan. 18, 2016, pp. 1-12, Published: EP.

European Patent Office, "Extended European Search Report from EP Application No. 17191611.7", from Foreign Counterpart to U.S. Appl. No. 13/833,188, dated Jan. 22, 2018, pp. 1-10, Published: US.

International Bureau, "International Preliminary Report on Patentability from PCT Application No. PCT/US2013/031933", from Foreign Counterpart to U.S. Appl. No. 13/833,188, dated May 14, 2015, pp. 1-8, Published: Switzerland.

International Searching Authority, "International Search Report and Written Opinion from PCT Application No. PCT/US2013/031933", from Foreign Counterpart to U.S. Appl. No. 13/833,188, dated Jul. 26, 2013, pp. 1-12, Published: WO.

IP Australia, "Patent Examination Report No. 1 from AU Application No. 2013338583", from Foreign Counterpart to U.S. Appl. No. 13/833,188, dated Sep. 28, 2016, pp. 1-3, Published: AU.

Kohno, "Structures and Theories of Software Antennas for Software Defined Radio", IEICE Trans. Commun. vol. E83-B, No. 6, Jun. 2000, pp. 1189-1199.

Mitchell, "Data transmission using a spectrum sliced, radio-over-fibre link", Conference vol. 6194 Milimeter-Wave and Terahertz Photonics, Apr. 19, 2006, p. 1.

Mitchell, "Radio-over-fibre using spectrum sliced optical links", SPIE Proceedings vol. 5466 Microwave and Terahertz Photonics, Sep. 1, 2004, p. 1.

Morell, "Joint Time Slot Optimization and Fair Bandwidth Allocation for DVB-RCS Systems", IEEE Globecom Telecommunications and System Engineering Department (TES), 2006, pp. 1-5.

Razavilar et al, "Software Radio Architecture with Smart Antennas: A Tutorial on Algorithms and Complexity", IEEE Journal on Selected Areas in Communications, vol. 17, No. 4, Apr. 1999, pp. 662-676.

Robins, "A Front End Filter Subsystem for an Adaptive Radar Signal Processor", Lincoln Laboratory Massachusetts nstitute of Techonology, Jul. 12, 1991, pp. 1-89.

Staszewski et al., "Digital RF Processor Techiniques for Single-Chip Radios (Invited)", IEEE 2006 Custom Intergrated Circuits Conference (CICC) 1-4244-0076, Jul. 2006, pp. 1-8.

(56) References Cited

OTHER PUBLICATIONS

State Intellectual Property Office, P.R. China, "First Office Action from CN Application No. 201380056306.2", from Foreign Counterpart to U.S. Appl. No. 13/833,188, dated May 3, 2017, pp. 1-5, Published: CN.

Thandri, "Design of RF/IF Analog to Digital Converters for Software Radio Communication Receivers", Office of Graduate Studies of Texas A&m University, May 2006, pp. 1-203.

U.S. Patent and Trademark Office, "Advisory Action", U.S. Appl. No. 14/536,012, dated Mar. 18, 2016, pp. 1-3, Published: US.

U.S. Patent and Trademark Office, "Final Office Action", U.S. Appl. No. 13/713,070, dated Oct. 7, 2015, pp. 1-21, Published: US.

U.S. Patent and Trademark Office, "Final Office Action", U.S. Appl. No. 14/536,012, dated Dec. 17, 2015, pp. 1-11, Published: US.

U.S. Patent and Trademark Office, "Interview Summary", U.S. Appl. No. 13/833,188, dated Aug. 27, 2014, pp. 1-4, Published: US.

U.S. Patent and Trademark Office, "Notice of Allowance", U.S. Appl. No. 13/833,188, dated Sep. 25, 2014, pp. 1-7, Published: US.

U.S. Patent and Trademark Office, "Notice of Allowance", U.S. Appl. No. 14/536,012, dated Jun. 6, 2016, pp. 1-10, Published: US.

U.S. Patent and Trademark Office, "Notice of Allowance", U.S. Appl. No. 15/283,948, dated Jan. 3, 2018, pp. 1-32, Published: US.

U.S. Patent and Trademark Office, "Office Action" U.S. Appl. No. 14/536,012, dated Sep. 15, 2015, pp. 1-28, Published: US.

U.S. Patent and Trademark Office, "Office Action", U.S. Appl. No. 13/833,188, dated Jun. 30, 2014, pp. 1-22, Published: US.

U.S. Patent and Trademark Office, "Office Action", U.S. Appl. No. 15/283,948, dated Aug. 16, 2017, pp. 1-19, Published: US.

Wala, "A New Microcell Architecture Using Digital Optical Transport", IEEE 0-7803-1266-X/93, 43rd IEEE Vehicular Technology Conference, May 18-20, 1993, pp. 585-588.

Yoong et al., "Mini-slot TDM WDM optical networks", Springer Science+Business Media, LLC, Sep. 15, 2007, p. 1.

European Patent Office, "Communication pursuant to Rule 164(1) from EP Application No. 13850111.9 dated Sep. 17, 2015", from Foreign Counterpart to U.S. Appl. No. 13/833,188, pp. 1-7, Published: EP.

Korean Intellectual Property Office, "Notice of Non-Final Rejection from KR Application No. 10-2015-7013359 dated Jun. 3, 2019", from Foreign Counterpart to U.S. Appl. No. 13/833,188, pp. 1-7, Published: KR.

Korean Intellectual Property Office, "Notice of Allowance of Patent from KR Application No. 10-2015-7013359 dated Aug. 27, 2019", from Foreign Counterpart to U.S. Appl. No. 13/833,188, pp. 1-3, Published: KR.

Canadian Intellectual Property Office, "Office Action from CA Application No. 2885238", from Foreign counterpart to U.S. Appl. No. 13/833,188, dated Jan. 28, 2020, pp. 1-7, Published: CA.

* cited by examiner

DIGITAL BASEBAND TRANSPORT IN TELECOMMUNICATIONS DISTRIBUTION SYSTEMS

CROSS-REFERENCE TO RELATED APPLICATIONS

This application is a continuation of U.S. patent application Ser. No. 15/283,948 filed Oct. 3, 2016 and titled "DIGITAL BASEBAND TRANSPORT IN TELECOMMUNICATIONS DISTRIBUTION SYSTEMS", which is a continuation of U.S. patent application Ser. No. 14/536,012 filed Nov. 7, 2014 and titled "DIGITAL BASEBAND TRANSPORT IN TELECOMMUNICATIONS DISTRIBUTION SYSTEMS", which is a continuation of U.S. patent application Ser. No. 13/833,188 filed Mar. 15, 2013 and titled "Digital Baseband Transport in Telecommunications Distribution Systems", which claims the benefit of U.S. Provisional Application Ser. No. 61/720,620 filed Oct. 31, 2012 and titled "Digital Baseband Transport" and U.S. Provisional Application Ser. No. 61/751,982 filed Jan. 14, 2013 and titled "Summing Circuit for Complex Telecommunications Signals", the contents of each of which are incorporated herein by reference.

TECHNICAL FIELD

The present invention relates generally to telecommunications and, more particularly (although not necessarily exclusively), to digital baseband transport in telecommunications distribution systems.

BACKGROUND

Telecommunications systems can include, among other types, a distributed antenna system ("DAS"). A DAS can be used to extend the coverage of a cellular communication system to areas of traditionally low signal coverage, such as within buildings, tunnels, or in areas obstructed by terrain features. A DAS can extend coverage by receiving signals from a base station of a cellular communication system and re-transmitting the signals directly into low-coverage areas.

Reducing bandwidth needed for transport of call information in telecommunications systems, such as DAS's, is desirable.

SUMMARY

In one aspect, a telecommunications system is provided that includes a unit for communicating channelized digital baseband signals with remotely located units. The channelized digital baseband signals include call information for wireless communication. The unit includes a channelizer section and a transport section. The channelizer section can extract, per channel, the channelized digital baseband signals using channel filters and digital down-converters. The transport section can format the channelized digital baseband signals for transport together using a transport schedule unit for packetizing and packet scheduling the channelized digital baseband signals.

In another aspect, a distributed antenna system is provided that includes at least two remote units, a head end unit, a channelizer section, and a transport section. The remote units can wirelessly transmitting signals in a coverage area. The head unit can communicate channelized digital baseband signals with the remote units. The channelized digital baseband signals include call information for wireless communication. The channelizer section can extract, per channel, the channelized digital baseband signals using channel filters and digital down-converts. The transport section can format the channelized digital baseband signals for transport together using a transport schedule unit for packetizing and packet scheduling the channelized digital baseband signals.

In another aspect, a telecommunications system is provided that includes a unit for communicating channelized digital baseband signals with remotely located units. The channelized digital baseband signals include call information for wireless communication. The unit includes a transport section and a signal processing subsystem. The transport section can format the channelized digital baseband signals for transport together using a transport schedule unit for packetizing and packet scheduling the channelized digital baseband signals. The signal processing subsystem can control a gain of each of a plurality of uplink digital baseband signals received from the remotely located units independently prior to summing the plurality of uplink digital baseband signals.

The details of one or more aspects and examples are set forth in the accompanying drawings and the description below. Other features and aspects will become apparent from the description, the drawings, and the claims.

DETAILED DESCRIPTION

Figure 1:
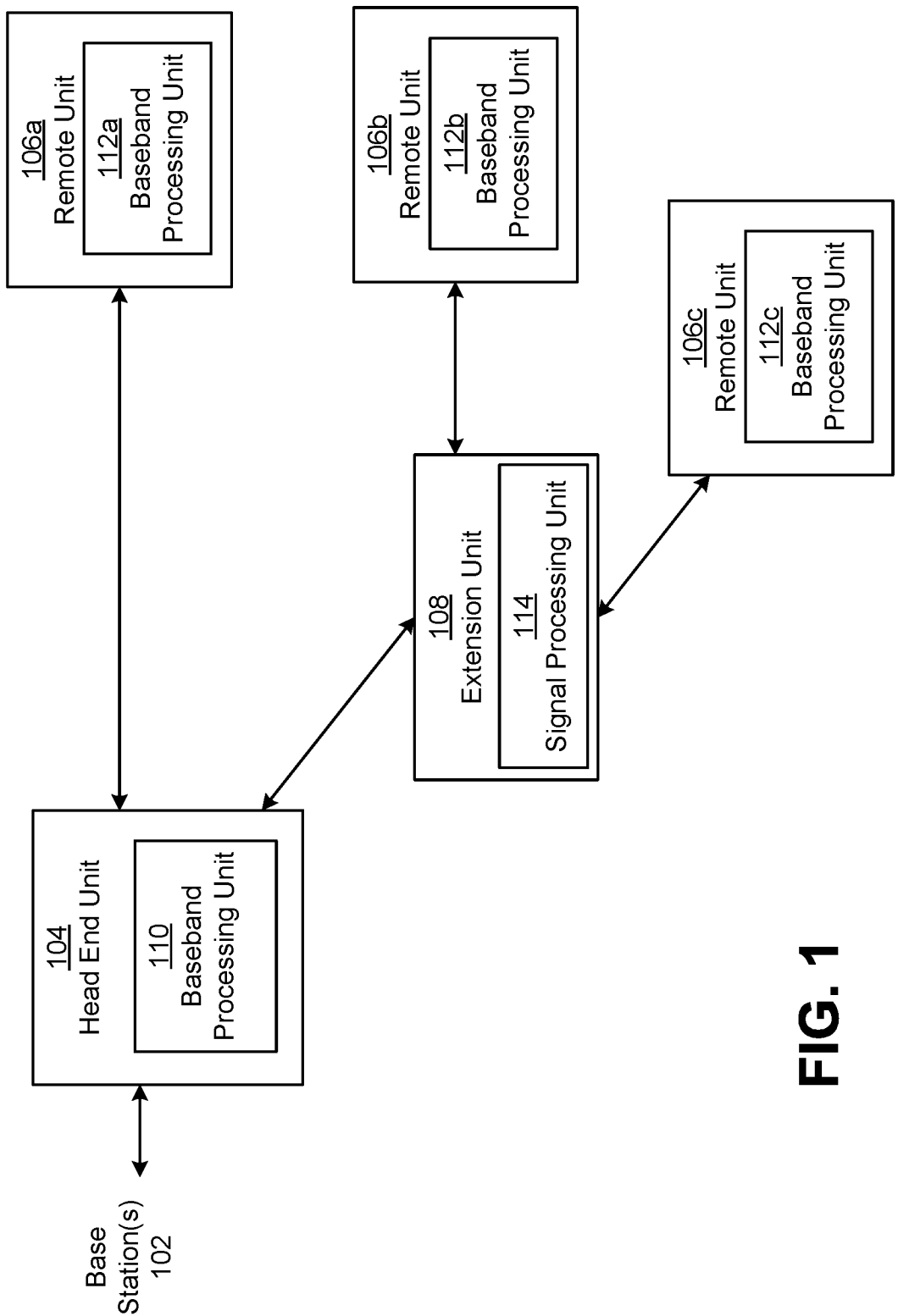
FIG. 1 is a block diagram of an example of a distributed antenna system with baseband processing units.

Certain aspects and examples of the present invention are directed to a telecommunications system, such as a distributed antenna system (DAS), that can transport digital base signals on a channel-by-channel basis between components of a telecommunications system. For example, a DAS can provide for distribution of multi-channel and multi-band RF signals for cellular and mobile communication systems using digital down- and up-conversion to baseband and channelization of the baseband signals, preparation for digital transport of the baseband signal samples employing a packet scheduler, transport over a synchronous or asynchronous digital link, and the phase synchronous re-assembly of a part of or the entire original spectrum, including all or a selection of the digitized channels at original frequencies without the introduction of noticeable amplitude and phase ripple.

In one aspect, a DAS includes a first unit and second unit located remotely from the first unit and communicatively coupled to the first unit by a communications network. The second unit can extract digital baseband signals from a digitized RF band that has RF signals, and cause the digital baseband signals to be transported to the first unit using the communications network. The first unit can create an RF band that includes the RF signals using the digital baseband signals received from the second unit. The RF band may be a cellular band for mobile communication. The second unit may digitize an original version of the RF band to generate the digitized RF band, and may extract the digital baseband signals by applying digital down-conversion and digital up-conversion to separate channels. The second unit can include a packet scheduler that can prepare the digital baseband signals for transport over the communications network. The communications network may be a synchronous or asynchronous digital link. The first unit may create the RF band using phase synchronous re-assembly of at least part of the original version of the RF band. The RF band can include at least some of the digital baseband signals in analog form and at original frequencies. In other aspects, the DAS includes sub-systems that can convert between digital signals with call information and digitized baseband signals without converting to or from RF or an RF band.

In another aspect, a digitized cellular spectrum is digitally down-converted and channelized. The digital baseband signals are prepared for digital transport using a packet scheduler. The digital baseband signals are transported over a synchronous or asynchronous digital link to a unit. At least part of an original cellular spectrum, including at least some digitized channels at original frequencies, is re-assembled using the digital baseband signals.

In some aspects, the bandwidth of a digital transport link can be used efficiently by sending baseband signals of the digitized RF channels of a given RF band at a minimum sample rate. In some aspects, only the information modulated on the carriers is digitized and transported instead of the entire RF band. An efficient way to transport useful information can include transporting the baseband modulation or complex envelope of each carrier independently. The carriers themselves do not need to be transported. The gaps between the channels do not need to be transported. The frequencies of the channels can be provided once during system initialization and later used to recreate an RF signal that includes the channelized information. Sampling and transporting a complex envelope or baseband modulation of each active channel in a band can result in a much lower sample rate than sampling and transporting an entire RF band. For example, more channels can be transported on a given link. Optimizing the transport may be useful to support MIMO, new bands, or otherwise for bandwidth. Transporting digital baseband signals can remove interference, allowing gain equalization/power allocation and flexibility in assigning channels to sectors, as well as dynamic assignment of channels to sectors.

In some aspects, an RF band can be received by a unit at a first location and the entire spectrum of the RF band can be digitally converted. Baseband signals from the digitized RF band can be extracted by channel. The extracted baseband signals can be transported over a medium from one location to another location. At the second location, the baseband signals can be digitally interpolated by channel, after which the interpolated signals can be added together and the total digital signal can be converted to analog form. The resulting RF band can be outputted. Interpolation may include increasing the sample rate of a digital signal without creating aliased harmonic content.

Certain aspects and features can optimize performance in processing baseband signals by minimizing the noise floor increase, minimizing non-linear limiting effects, and ensuring that the output signal remains within the allowed resolution of the signal. In some aspects, the gain of each input to a summer is selectively controlled to prevent one or more input signals from dominating and causing an overflow to the bit resolution of the output. The gain can be controlled (i.e., scaled) based on the peak average value of signals instead of a sample-by-sample basis so that distortion of the output, combined signal is reduced.

For example, two signals can be received in a head end unit from two different remote units of a DAS. The average power or average magnitude of the signals can be measured by an envelope peak detector. Signal magnitude can include signal voltage, power level, and/or digital signal level. A threshold magnitude or power can be set for each signal, which may be dynamically determined based on the number of remote units and/or number of signals. If the threshold for a signal is exceeded, the gain of a variable gain block can be reduced by an amount so that the signal does not exceed the threshold. If the threshold is not exceeded, the gain can be retained or otherwise the gain for the signal can be returned to a normal or default gain level. In some aspects, the variable gain block can be in a remote unit. The signals can be summed by an adder. Distortion of the summed signal can be reduced by, for example, avoiding gain reduction on a sample-by-sample basis of the summed signal.

FIG. 1 depicts an example of a DAS in communication with one or more base stations 102, which may be base transceiver stations. The DAS includes a head end unit 104, remote units 106*a-c*, and an extension unit 108. The DAS may be positioned in an area of low signal coverage, such as the interior of a building, to extend wireless communication coverage. Extending wireless coverage can include communicating signals between base stations 102 and wireless devices positioned in a coverage area of the DAS.

The head end unit 104 can receive downlink signals from one or more base stations 102 via a wired or wireless communication medium. The head end unit 104 can also provide uplink signals to the base stations 102.

The head end unit 104 can convert downlink signals received from the base stations 102, such as RF signals, into one or more digital data streams that include channelized baseband signals of call information extracted from the RF signals. The head end unit 104 can include circuitry and/or one or more components in a baseband processing unit 110 that can digitize the RF signals, extract call information per channel from the digitized signal as baseband signals, and prepare the channelized baseband digital signals for transport as digital data streams.

The head end unit 104 can provide downlink digital data streams to some of the remote units, such as remote unit 106*a*, directly over a communication medium that may be electrical wire, copper cable, such as coaxial cable, optical fiber, wireless, or other suitable communication medium. The head end unit 104 may also or alternatively provide downlink digital data streams to some of the remote units, such as remote units 106b-c, via the extension unit 108. An example of the extension unit 108 is a transport extension node. The extension unit 108 can extend the range of the head end unit 104.

The remote units 106a-c can convert digital data streams to RF signals. The remote units 106a-c include baseband processing units 112a-c. Each of the baseband processing units 112a-c can obtain channelized baseband signals from the digital data streams, digitally up-convert the baseband signals on channel-by-channel bases, sum the up-converted digital signals, and convert the summed digital signals to downlink RF signals. The remote units 106a-c can up-convert and amplify the downlink RF signals, and radiate the downlink RF signals using antennas to a number of different wireless devices, such as (but not limited to) cellular phones, operating in the environment of the DAS. An example of remote units 106a-c includes a universal access point.

In an uplink direction, the remote units 106a-d can receive uplink RF signals from an environment serviced by the DAS. The baseband processing units 112a-c can digitize the RF signals, extract call information per channel from the digitized signal as baseband signals, and prepare the channelized baseband digital signals for transport as digital data streams to the head end unit 104 or the extension unit 108. The extension unit 108 can include circuitry, such as a signal processing unit 114 that can process and sum, or otherwise combine, uplink digital baseband data streams from more than one remote unit and provide the summed uplink digital baseband data stream to the head end unit 104.

The baseband processing unit 110 of the head end unit 104 can sum uplink digital data streams from more than one remote unit, obtain channelized baseband signals from the uplink digital data streams, digitally up-convert the baseband signals on channel-by-channel bases, sum the up-converted digital signals, and convert the summed digital signals to uplink RF signals. The head end unit 104 can amplify the uplink RF signals and provide the uplink RF signals to one or more base stations 102.

Although the DAS is depicted as including one head end unit 104, one extension unit 108, and three remote units 106a-c, any number (including one) of each can be used. For example, a DAS may include dozens of extension units and hundreds of remote antenna units.

Figure 2:
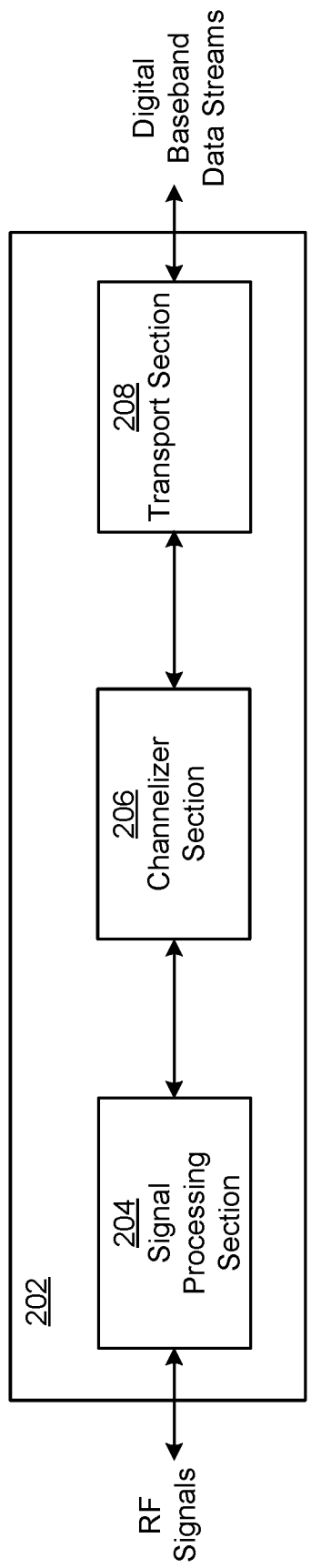
FIG. 2 is a block diagram of an example of a baseband processing unit.

FIG. 2 depicts an example of a baseband processing unit 202, such as baseband processing unit 110 or one of baseband processing units 112a-c in FIG. 1. The baseband processing unit 202 includes a signal processing section 204, a channelizer section 206, and a transport section 208.

The signal processing section 204 can receive RF signals, amplify and down-convert the RF signals, and convert the RF signals to digital signals. The signal processing section 204 can also convert digital signals to RF signals, and up-convert, amplify, and provide the RF signals.

The channelizer section 206 can process the digital signals on channel-by-channel bases. For example, the channelizer section 206 can digitally down-convert the digital signals to baseband and provide channelized baseband signals, and digitally up-convert channelized baseband signals and combine the digitally up-converted channelized baseband signals to provide digital signals.

The transport section 208 can prepare the channelized baseband signals for transport and obtain channelized baseband signals from a communication medium. For example, the transport section 208 can serialize and frame channelized baseband signals for transport and can de-frame and de-serialize the channelized baseband signals.

Figure 3:
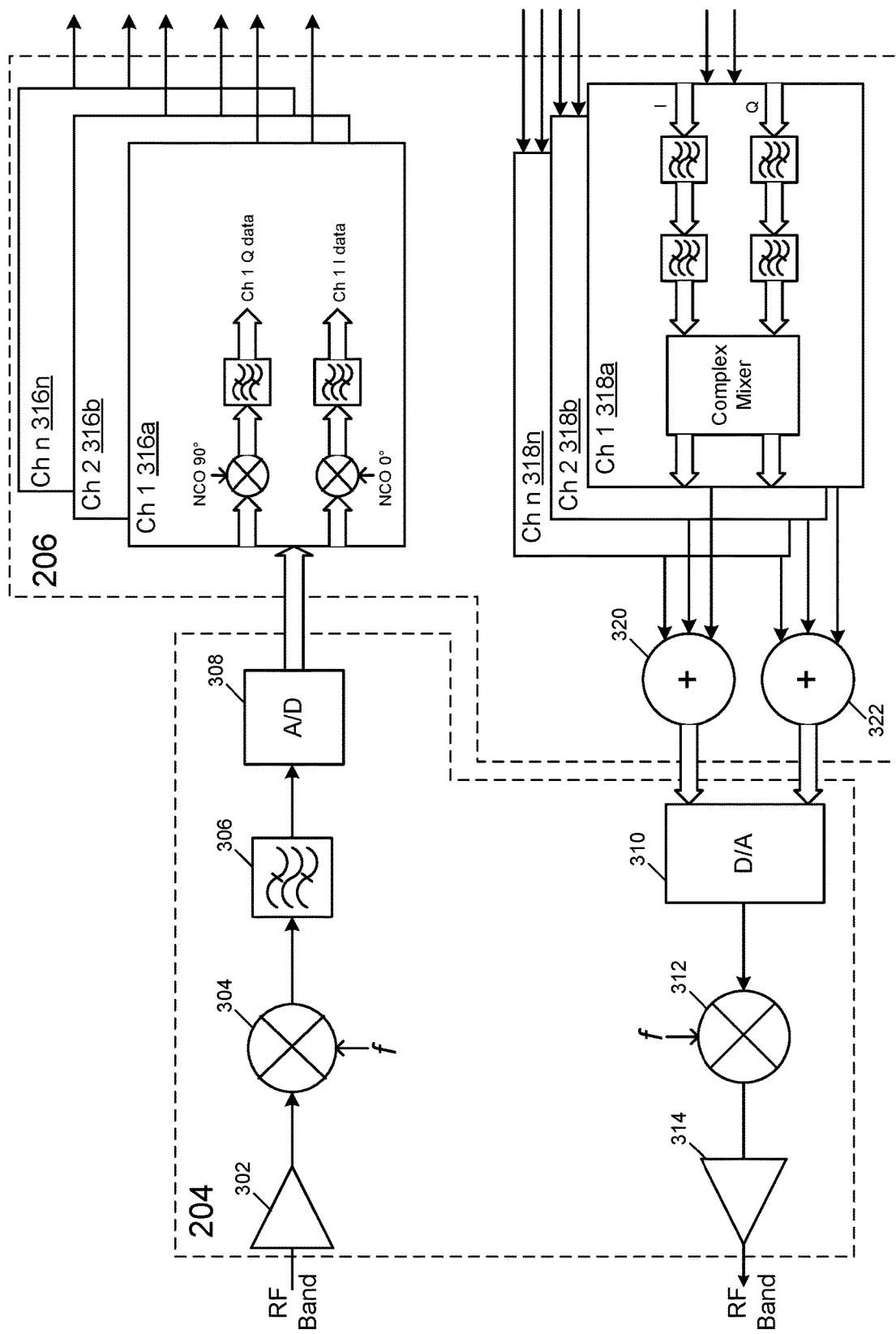
FIG. 3 is a schematic diagram of a signal processing section and a channelizer section of a baseband processing unit.

FIG. 3 depicts an example of the signal processing section 204 and the channelizer section 206. The signal processing section 204 includes an input amplifier 302, a down-converting mixer 304, a bandpass filter 306, and an analog-to-digital (ND) converter 308, a digital-to-analog (D/A) converter 310, an up-converting mixer 312, and an output amplifier 313.

The input amplifier 302 amplifies an RF band, which may be an RF spectrum including one or more carriers and information carried by the carriers. The down-converting mixer 304 can down-convert the RF band to an intermediate frequency using a mixing frequency. The bandpass filter 306 can filter the RF band at the intermediate frequency. In one example, the bandpass filter 306 has a bandwidth of 75 MHz with a center frequency of 350 MHz. The ND converter 308 can convert the filtered RF band at the intermediate frequency according to a selected sample rate to digital signals.

The D/A converter 310 can convert digital signals to an analog RF signal at an intermediate frequency. The up-converting mixer 312 can up-convert the analog RF signal at the intermediate frequency to an RF signal using a mixing frequency, which may be the same as or different from the mixing frequency used by the down-converting mixer 304. The output amplifier 314 can amplify the up-converted RF signal for output as an RF band.

The channelizer section 206 includes down-converting channel modules 316a-n, up-converting channel modules 318a-n, and summers 320, 322. Each of the down-converting channel modules 316a-n and the up-converting channel modules 318a-n can be associated with a particular channel.

The down-converting channel modules 316a-n can demodulate each channel to baseband using I and Q mixers and numerically controlled oscillators (NCOs). Each NCO can be set to the center frequency of the channel. The output of the down-converting channel modules 316a-n can be digital signals sampled at a certain sample rate, such as 200 MHz. The digital signals can be digitally down-sampled by a decimation filter to reduce the sample rate to a level that is suitable for a single channel bandwidth. In an example involving seven active channels, seven decimation processes can be performed in parallel. The seven sets of I and Q data streams can be multiplexed onto a transport communication medium such that call information is transported but not the RF spectrum or information about the RF spectrum.

Active channels in an RF band can have different amplitudes. When the RF band is recreated at another location, the channels can be gain equalized, which can allow the system to allocate power per channel by automatically adjusting the gain of the system to maintain a preset power for each carrier in the system.

For example, an RF band may be 75 MHz wide and use a sample rate of 150 Msps to meet Nyquist. Each of seven active channels can be independently demodulated to baseband. Each baseband signal may only require a 10 Msps sampling rate to meet Nyquist, although a 13.5 Msps rate can be used for practical filtering, producing 94.5 Msps (7×13.5) of data. A sample rate of 94.5 Msps may be less than half of the sample rate needed for transporting the information and other information about the RF band, such as carrier information and information between call information. The transport communication medium can be an expensive component of a telecommunications system, such as a DAS. Furthermore, transport communication mediums have a fixed bandwidth and a fixed amount of data capacity. Reducing the number of samples can reduce the amount of transport bandwidth that is used for transporting the same amount of call information, along with information from more bands, such as MIMO bands, to be transported.

The up-converting channel modules 318a-n can filter and interpolate baseband signals per channel to digital signals using channel filters, up sample, lowpass filters, and complex mixers. The summers 320, 322 can add the outputs of the up-converting channel modules 318a-n before converting the summed outputs to analog signals. Although FIG. 3 depicts a complex output from the summers 320, 322, only a real portion of the signals can be outputted. Furthermore, FIG. 3 depicts a quadrature mixer as a complex mixer, but other types of mixers that can mix only real portions of the signals can be used.

The channelizer section 206 can be implemented in a device such as an FPGA, ASIC, or a DSP. The NCOs and I and Q mixers can together form mixing stages that can digitally mix in-phase and quadrature components of signals. Examples of NCOs include modulo-n NCOs, such as modulo-2000 NCOs. In some aspects, a processor in the channelizer section 206 can be pre-configured with data about the channels, including each channel's center frequency, and can control each module accordingly. In other aspects, the channelizer section 206 can dynamically determine data about each of the channels by analyzing a received spectrum, and can control each module accordingly.

Figure 4:
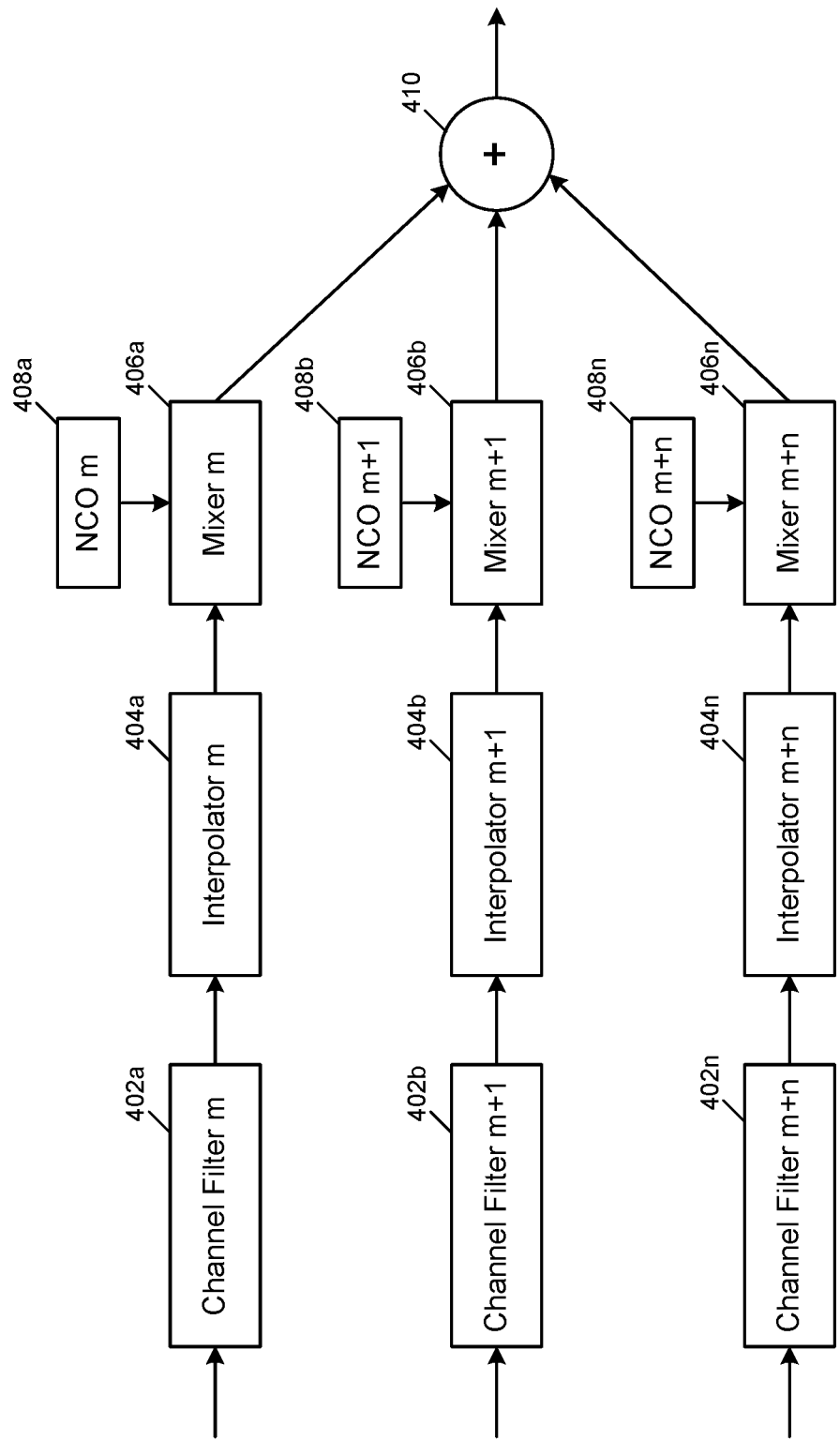
FIG. 4 is a block diagram of another example of part of a channelizer section of a baseband processing unit.

In some aspects, up-converting channel modules are used that can reassemble a frequency spectrum having adjacent or closely adjacent channels. FIG. 4 depicts an example of up-converting channel modules that can be used to reassemble adjacent or closely adjacent channels. The up-converting channel modules include channel filters 402a-n, interpolators 404a-n, mixers 406a-n, NCOs 408a-n, and a summer 410. Each channel filter, interpolator, mixer, and NCO may be associated with a channel.

Re-assembly of frequency spectrum can be achieved by positioning each of the baseband signals to an individual intermediate frequency. The re-assembly can be performed with accuracy to avoid phase and amplitude ripple by the use of complement filter slopes. In one example, the falling slope of the filter n complements the rising slope of filter n+1 to the result 1 if filter 1 is positioned with its edge frequency at the bottom edge frequency of filter 2. A linear transition between passband and blocking frequency area can be used. Other examples can be a raised cosine function.

For example, distortion caused by the DAS or signals spilling over into adjacent channels can be minimized for two or more communication channels between each of which is relatively small spacing (i.e. frequency offset). The amplitude response between the channels can be flat and the phase response can be linear.

The modules of FIG. 4 can be used for combining multiple baseband channels to build larger, single communication channels. Larger, single communication channels may useful for avoiding creating additional digital down-converters and digital up-converters for each individual channel bandwidth. For example, a DAS may create signals for 5 MHz (LTE and UMTS), 10 MHz, 15 MHz, and 20 MHz (LTE) bands. A digital down-converter and digital up-converter for one or more of these bandwidths may go unused if the particular band is not to be transported. Instead, the system can include N number of 5 MHz digital down-converters and digital up-converters that can be combined to create larger bandwidths if needed. The system can use three 5 MHz baseband channels to build the 15 MHz LTE channel without requiring a digital down-converter and digital up-converter for 15 MHz. There can also be negligible distortion.

To facilitate the re-assembly of adjacent frequency blocks and phase fine tuning to avoid the introduction of amplitude and phase ripple at the border, a continuous wave (cw) signal can be added to a left channel, for example just exactly at the edge frequency of block one, and another cw frequency with a 180 degrees phase shift can be added at the bottom edge frequency of a right channel. If the phase of both channels are phase adjusted properly, the cw signals can cancel each other. This can be monitored and used to adjust the phase offset compensation one signal might need versus the other.

Figure 5:
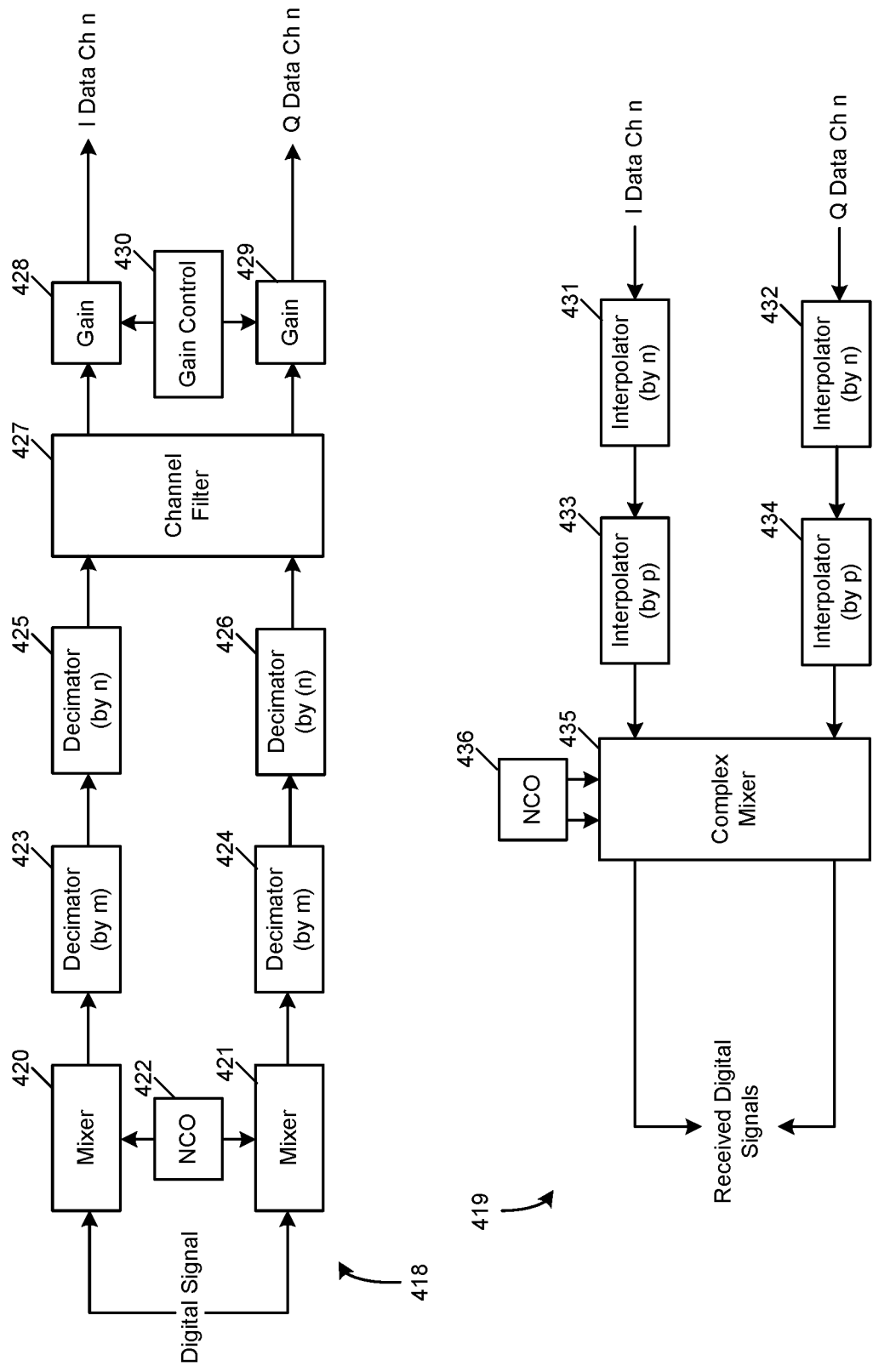
FIG. 5 is a block diagram of a down-converting channel module and an up-converting channel module according to one aspect.

FIG. 5 depicts an example of a down-converting module 419 and an up-converting module 419 that may be usable for, for example, wide bandwidth sub-bands. The down-converting module 418 includes mixers 420, 421 that use signals from a numerically controlled oscillator 422 to down-convert a digital signal to real and quadrature component baseband signals. The baseband signals can be decimated by decimators 423-426. Decimators 423, 424 can decimate the signals by dividing the sample rate by m and decimators 425, 426 can decimate the signals by dividing the sample rate by n. M can be greater than n. In some aspects, m is sixteen and n is two. An example of decimators 423, 424 is a cascaded integrator-comb. A channel filter 427 can filter the signals and gain blocks 428, 429 can control a gain of the signals according to a gain control 430, which may be an automatic level control, to produce real and quadrature digital baseband data for a channel.

The up-converting module 419 can include interpolators 431-434 that can interpolate real and quadrature digital baseband data. Interpolators 431, 432 can interpolate the signals by n and interpolators 433, 434 can interpolate signals by p. P can be greater than n. In some aspects, n is two and p is eight. A complex mixer 435 can use signals from a numerically controlled oscillator 436 to up-convert the signals to received digital signals.

Figure 6:
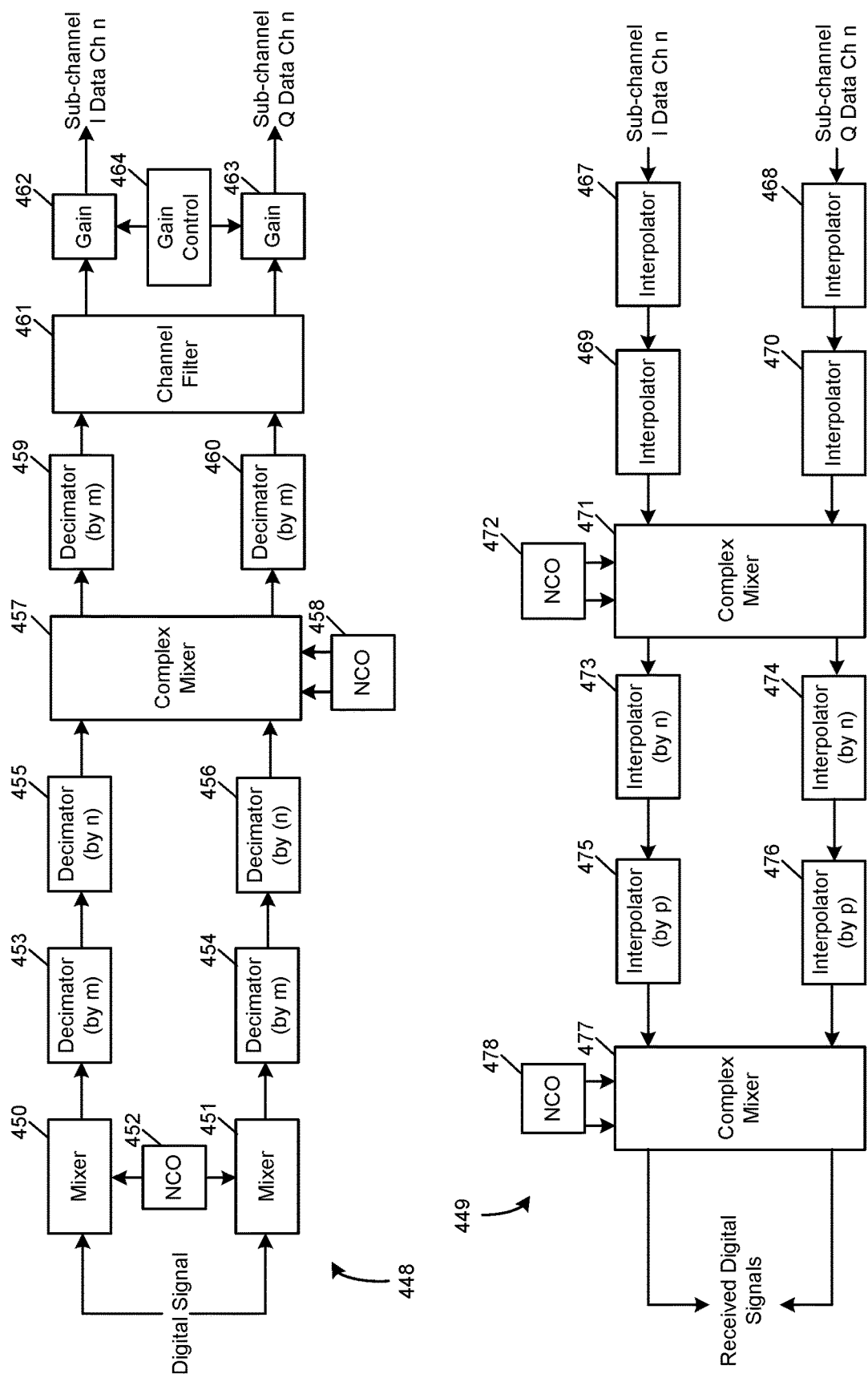
FIG. 6 is a block diagram of a down-converting channel module and an up-converting channel module according to another aspect.

FIG. 6 depicts an example of a down-converting module 448 and an up-converting module 449 that may be usable for, for example, narrow bandwidth sub-bands, and may reduce the number of multipliers for mixing. An example of a narrow bandwidth sub-band is 200 kHz. The down-converting module includes mixers 450, 451 that use signals from a numerically controlled oscillator 452 to down-convert a digital signal to real and quadrature component baseband signals. The baseband signals can be decimated by decimators 453-456. Decimators 453, 454 can decimate the signals by dividing the sample rate by m and decimators 455, 456 can decimate the signals by dividing the sample rate by n. M can be greater than n. In some aspects, m is sixteen and n is two. An example of decimators 453, 454 is a cascaded integrator-comb. A complex mixer 457 can down-convert the signals according to sine and cosine signals from a numerically controlled oscillator 458 to sub-channels of the channelized digital baseband signal being processed. The sub-channels may be narrow bandwidth digital baseband signals. Decimators 459, 460 can decimate the signals by dividing the sample rate by m. A channel filter 461 can filter the signals and gain blocks 462, 463 can control a gain of the signals according to a gain control 464, which may be an automatic level control, to produce sub-channel real and quadrature digital baseband data for a channel.

The up-converting module 449 can include interpolators 467-470 that can interpolate sub-channel real and quadrature digital baseband data for a channel. A complex mixer 471 can up-convert the signals according to sine and cosine signals from a numerically-controlled oscillator 472 to produce wideband digital baseband data. Interpolators 473, 474 can interpolate the signals by n and interpolators 475, 476 can interpolate signals by p. P can be greater than n. In some aspects, n is two and p is eight. A complex mixer 477 can use signals from a numerically controlled oscillator 478 to up-convert the signals to received digital signals.

Figure 7:
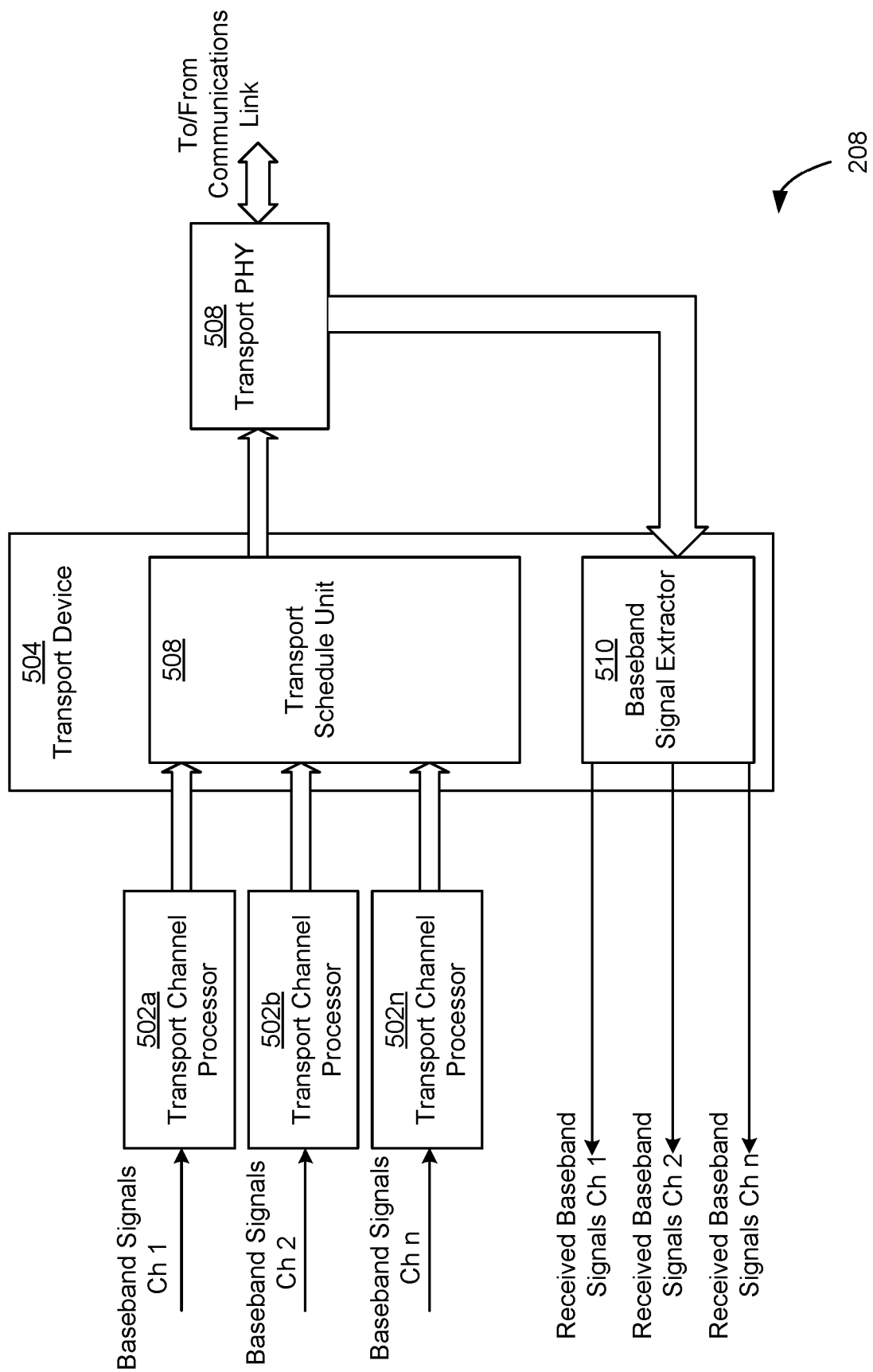
FIG. 7 is a block diagram of an example of a transport section of a baseband processing unit.

FIG. 7 depicts an example of the transport section 208. The transport section includes transport channel processors 502a-n, one for each channel, a transport device 504, and a transport physical interface device (PHY) 506. The transport device 504 includes a transport schedule unit 508 and a baseband signal extractor 510.

The transport channel processors 502a-n can receive baseband signals per channel from channelizer section 206 of FIG. 2. The transport channel processors can perform actions, such as decimation of baseband signal samples to further reduce the sample rate, filtering to further reduce bandwidth of the signal, and changing the signal gain. Filtering to reduce bandwidth of the signal can include analyzing each channel to determine whether to forward or not forward a certain channel based on the analysis.

The transport schedule unit 508 can receive the outputs of the transport channel processors 502a-n. The transport schedule unit 508 can perform framing, serializing, packetizing, and scheduling of the baseband signals for transport. For example, the transport schedule unit 508 can include a serializer, a packetizer, and a packet scheduler. Framing can include framing signals in the channels into Ethernet frames according to a packet schedule.

The transport PHY 506 can receive serialized baseband signals from the transport schedule unit 508. The transport PHY 506 can prepare the signals for transmission over a synchronous or asynchronous digital transport link. The transport PHY 506 can also detect received serialized baseband signals and provide the serialized baseband signals to the baseband signal extractor 510. The baseband signal extractor 510 can de-frame and de-serialize the received signals and provide baseband signals, per channel, to the channelizer section 206 of FIG. 2. The baseband signal extractor 510 may also include a band combiner for combining bands.

Figure 8:
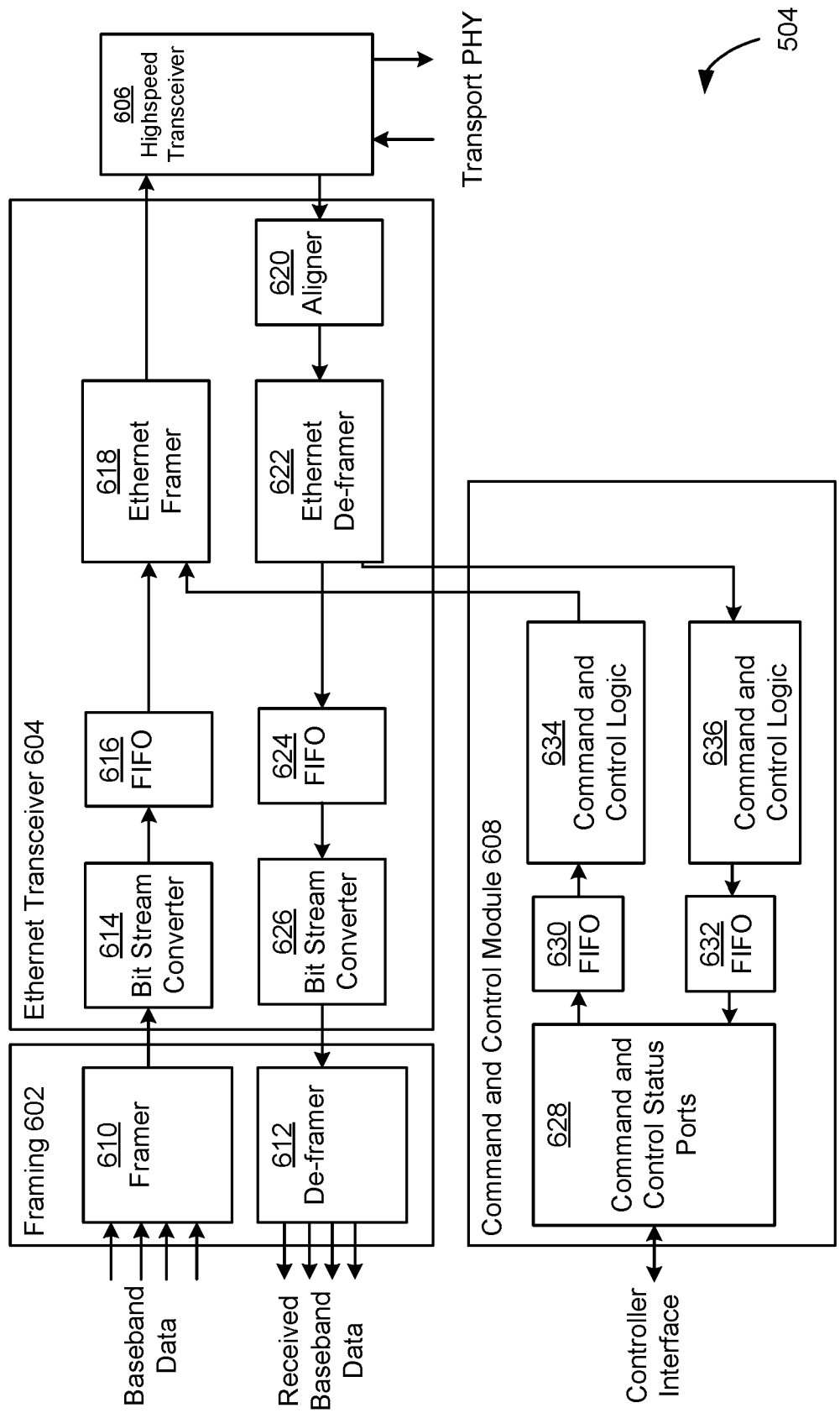
FIG. 8 is a block diagram of an example of a transport device in a transport section.

FIG. 8 depicts an example of the transport device 504. The transport device 504 includes a framing section 602, an Ethernet transceiver section 604, a highspeed transceiver 606, and a command and control module 608.

Figure 9:
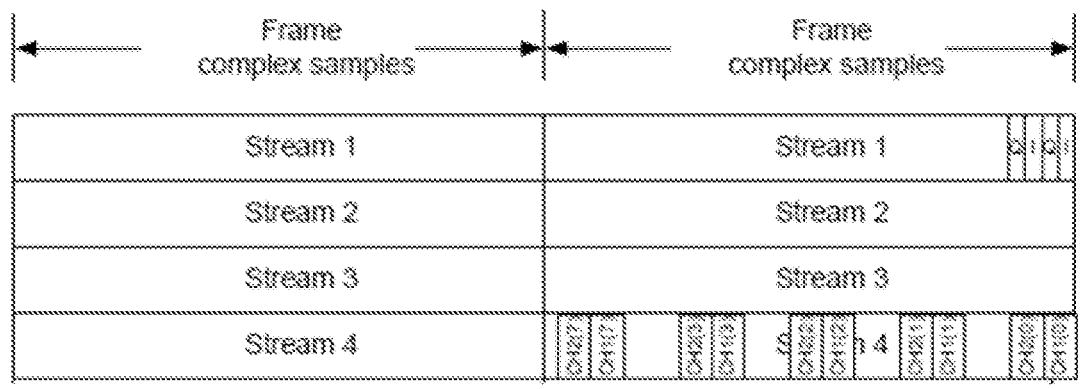
FIG. 9 depicts an example of an output of a framing section of a transport device.

The framing section 602 includes a framer 610 and a de-framer 612. The framer 610 can frame baseband data in channelized baseband signals by mapping the baseband data to frames that include multiple sub-bands. Each frame can include multiple streams. Each stream can include multiple channels from multiple bands. Instead of grouping samples from the same channel together, samples from different channels are interleaved, which may help reduce latency and memory requirements. FIG. 9 is an example of the output of the framer 610. The output includes frames in which are streams of signals. As shown via example in the lower right-hand band in FIG. 9, the frame can include samples from different channels interleaved in the stream and in the frame.

In some aspects, the framer 610 can receive baseband signals as 12-bit signals and output frames at 48 bits. The de-framer 612 can receive frames and output baseband signals that include received baseband data.

The Ethernet transceiver 604 includes a bit stream converter 614, a FIFO 616, an Ethernet framer 618, an aligner 620, an Ethernet de-framer 622, a second FIFO 624, and a second bit stream converter 626.

The bit stream converter 614 can convert the bit rate of the frames from the framing section 602 into a different bit rate. For example, the bit stream converter 614 can convert frames at 48 bits to 64 bits. The FIFO 616 may buffer the bit-rate-converted frames for the Ethernet framer 618, which can map the frames into Ethernet frames. A frame may be mapped into multiple Ethernet frames with no pattern between one Ethernet frame to the next. The Ethernet frames can be provided to the highspeed transceiver 606, which can include encoding and scrambler processes that further mixes the data and encode into different bit rates before serializing the Ethernet frames into bit streams.

The aligner 620 can align received Ethernet frames from the highspeed transceiver 606. The Ethernet de-framer 622 can extract frames from the Ethernet frames. The second FIFO 624 can buffer the frames. The second bit stream converter 626 can convert the frames from one bit rate to another bit rate prior to providing the frames to the framing section 602.

The command and control module 608 includes command and control status ports 628, FIFOs 630, 632, and command and control logic units 634, 636. The command and control status ports 628 can communicate with a controller interface to provide command and control information and receive control commands. The command and control logic unit 634 can provide commands for controlling the Ethernet framer 618. The command and control logic unit 636 can receive information from the Ethernet de-framer 622 that can be provided to the controller interface.

Figure 10:
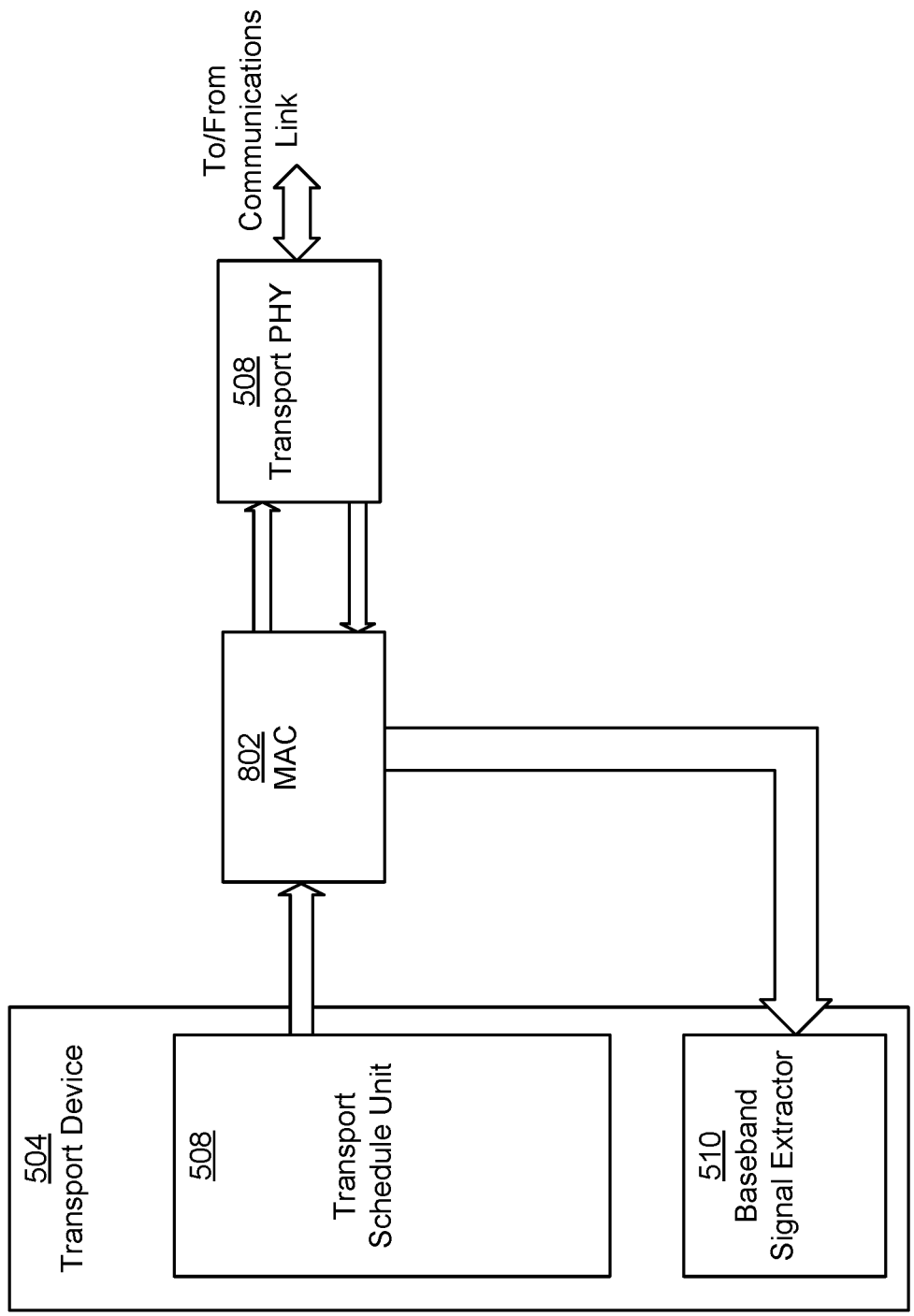
FIG. 10 is a block diagram of another example of a transport section of a baseband processing unit.

FIG. 10 is another example of the transport section 208 used for an asynchronous transport link. The transport section 208 includes the transport device 504 and transport PHY 506 from FIG. 7, and a media access controller (MAC) 802 between the transport device 504 and the transport PHY 506. The MAC 802 can provide for the multiple access scheme of the digital transport media. For example, as packets that are sent over the asynchronous link can have a changed order and timing relationship, a packet scheduler at the receiving end can be used to re-establish the correct order and exact timing relationship between the packets and re-establish synchronicity before sending them to the synchronously operated transport channel processing. In this example, the digital transport can employ a LAN, WAN, or any other internet protocol (IP) transport mechanism or networks. If the network is either of these types, the actual sending can occur with a non-synchronous transport network candidate.

In a building, there may be several sets of channels, each referred to as a sector, which can be sent to different groups of remote units. Using baseband transport, it may be possible to dynamically reassign the channels to different sectors to accommodate changing capacity requirements.

Noise or interference located between channels may not be transported and hence may not be recreated after transport. For example, a remote unit may receive a very strong rogue mobile located between the desired channels. This mobile is not using the DAS. It is typically communicating with a macro-cell outside the building, perhaps several miles away. The mobile's power control is set very high to reach the macro-cell but the mobile is very close to the DAS antenna. A DAS implementing baseband transport can eliminate or at least heavily suppress this signal through filtering.

Furthermore, an f1 to f2 repeater can be created. In this situation, a channel may be recreated at the remote on a different frequency than it appears at the base station. This can provide another level of flexibility not found when digitizing full bands.

Another possible use of baseband transport using channelization is that the system can easily support frequency hopping. GSM is one example of an air interface standard that supports frequency hopping to mitigate the effect of fading. Every frame or 4.615 msec, the GSM mobile hops to a different RF carrier frequency. Baseband transport using channelization can allow each independent channel modulators and demodulators to dynamically change to a different channel within the band synchronous with the mobile device.

For example, if a BTS has 8 active RF carriers in a cell and the number of hopping channels is 64, then the DAS may require 64 separate channels to cover every frequency in the hopping list. Alternatively, the DAS may use only 8 channels and dynamically change frequencies at the same time as the base station and the mobile. Aspects of the technique can reduce the number of digital modulators/demodulators by 56 since only 8 digital channels may be required compared to 64 with the existing method. The DAS can be time synchronized with the BTS to facilitate such an improvement.

One feature of a DAS can include the ability to measure and report traffic usage for a given remote or group of remotes. This can allow the system planners to better allocate capacity to the remotes that need it. Baseband transport using channelization can allow the system to easily monitor per channel traffic in the system since the channels are already separated. One example is an RSSI-based traffic monitor for a TDMA air interface like GSM. The system can monitor the UL channel individually and measure the RSSI of each channel. This RSSI can then be compared to a threshold, usually 10-15 dB above the noise level. The system can then count the number of occurrences that the RSSI threshold is reached and can report a traffic usage statistics for the system per channel and per remote. It can also keep statistics on the time of day that the traffic is higher allowing the system to allocate capacity dynamically depending on the time of day. The separation of each channel allows for this type of traffic monitoring that is not possible in full band DAS systems without the use of a separate, time-shared, measurement receiver.

A telecommunications system according to some aspects can include devices and components that can prevent overflow in summing or otherwise combining two or more digital baseband signals that are complex (i.e., both real and quadrature signal components). For example, the telecommunications system can include a signal processing subsystem that can control a gain of each digital baseband signal, independently of other digital baseband signals from remote units, prior to summing the digital baseband signals. The signal processing subsystem may be in a head end unit and/or an extension unit of a DAS, and may include summers or adders in the head end unit and/or the extension unit. The signal processing subsystem can include variable gain blocks and signal envelope peak detectors, one each for each digital data stream including baseband information to be summed. A signal envelope peak detector can change the associated variable gain block to reduce or prevent overflow.

Figure 11:
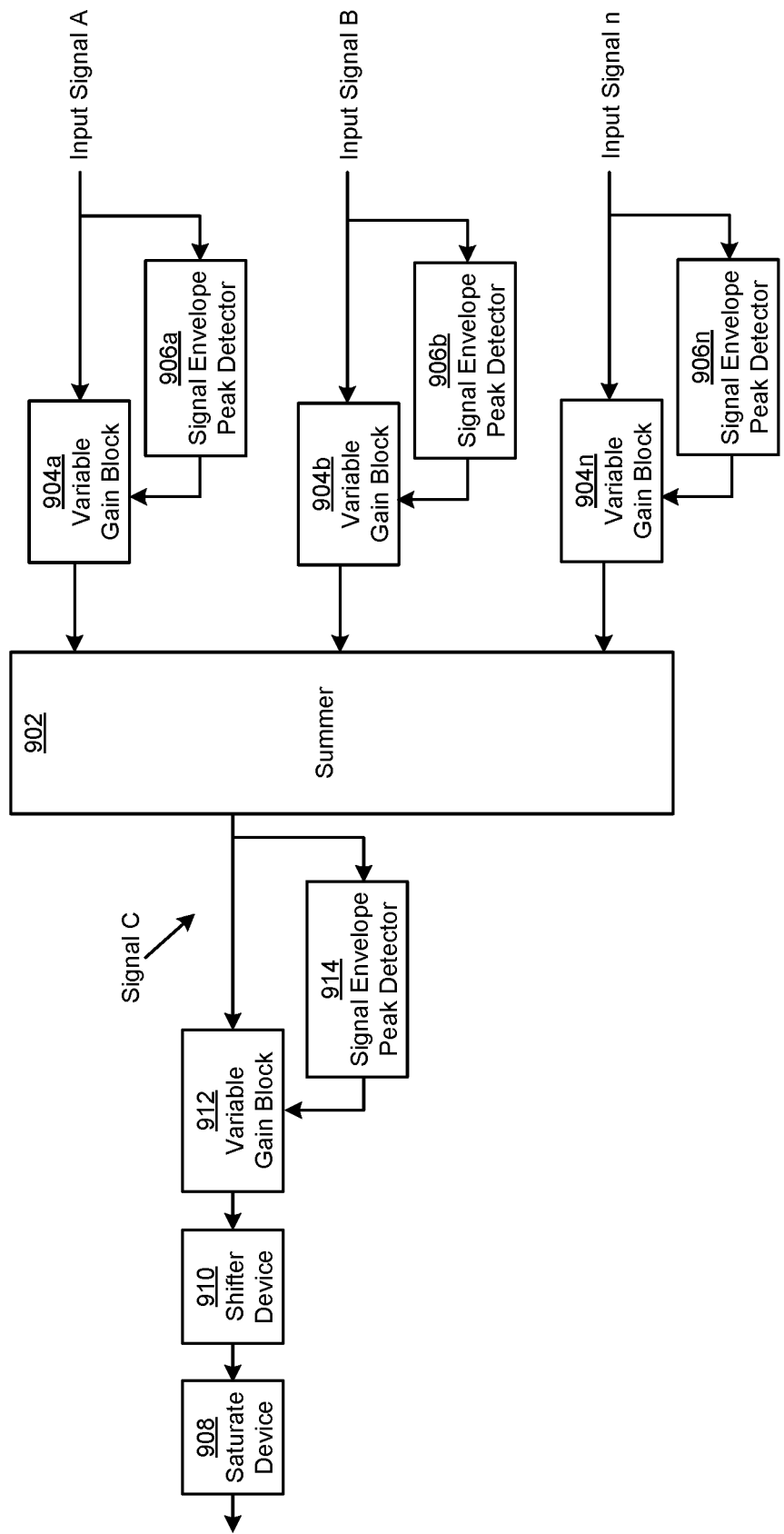
FIG. 11 is a block diagram of an example of a signal processing subsystem that includes a summer for summing digital baseband signals.

FIG. 11 is a block diagram of a signal processing subsystem for a head end unit or an extension unit of a DAS. The signal processing subsystem includes a summer 902, variable gain blocks 904a-n, and signal envelope peak detectors 906a-n. The signal processing subsystem of FIG. 11 also includes a saturate device 908, shifter device 910, variable gain block 912, and signal envelope peak detector 914 subsequent to the summer 902. In other aspects, the signal processing subsystem does not include the saturate device 908, shifter device 910, variable gain block 912, and signal envelope peak detector 914.

These devices and blocks may be located in one component of a DAS or may be distributed among components of a DAS. For example, each of the variable gain blocks 904a-n and associated signal envelope peak detectors 906a-n may be in one or more remote units, while the other blocks may be in an extension unit or a head end unit. In some aspects, the summer 902 is in a head end unit, for example summers 320 and 322 of FIG. 3 or summer 410 of FIG. 4.

The signal envelope peak detectors 906a-n can receive different input signals that may be digital baseband data streams from, for example, multiple remote units. In some aspects, more than one RF channel may be contained in a digital baseband channel. The signal envelope peak detectors 906a-n can determine peak averages of the signals. Each of the peak averages is compared to a maximum threshold for the respective input signal. The maximum threshold may be pre-configured on system installation, set or modified subsequent to installation, and/or dynamically set by measuring input signals. If the peak average is less than the maximum threshold, a scale factor for the associated variable gain block is set to one. If the peak average is greater than the maximum threshold, the scale factor for the associated variable gain block is modified so that the input signal is scaled to not cause an overflow at the output of the summer. The summer 902 may be in a complex scaling/limiting circuit and can be an M-input, N-bit adder with N+Ceiling(log 2(M)) bit output.

To minimize the effects of increasing the noise floor of the entire sum when only one or a few of the input signals is large, the summer 902 can also use selective input attenuation. If an input is above some programmable level that is less than the maximum allowed level, then that input signal is scaled by a programmable amount, thus making it less likely that the sum of the signals exceed the maximum allowed resolution. For example, assume eight signals are summed, and one signal is at full scale. If the scaling is applied to the sum, then the output=scale factor*(in1+in2 . . . . In8), meaning that the scaling factor is applied to every input, thus increasing the noise floor of every input in fixed point implementations. If the scale factor is applied to just the strong input (assume input is 8), then the output is in1+in2+ . . . +in7+in8*scale factor, thus preserving the noise floor on all the inputs except the input with the strong signal. This can optimize overall system performance because the noise floor is preserved on most of the inputs, where weak signals may be received, while preventing a strong signal from exceeding the allowed resolution of the signal. The input scale level may have fine or course resolution. In particular, a right shift can be used to reduce signal level in 6 dB steps.

If the input signals are complex, then the input level used to determine if scaling can occur can be based on the complex magnitude of the signal, and any scaling of the input can be applied to both the real and quadrature components of the input signal.

The signals can have positive and negative components. The term "maximum" is used while recognizing that this refers to both the maximum magnitude of both the positive and negative values allowed by the system. I.e., there is a maximum positive value allowed, and there is a maximum magnitude negative value allowed, which can also be referred to as the minimum allowed value.

In a more complex implementation, the input scaling circuit can analyze the unscaled sum and the individual input levels that result in that sum and decide how to scale each input signal before summing the input-scaled signals together.

If, for example, two 12-bit signals are summed, 13 bits can be retained. The output of the summer 902 is a signal C that can be scaled again by variable gain block 912 and signal envelope peak detector 914. The scaled signal C can be shifted by shifter device 910 and saturated by saturate device 908. A threshold for the summed signal can be set based on which bits that the shifter device 910 removes, for example, or otherwise may be a static threshold. The shifter device 910 can select n bits out of the signal for the saturate device 908. For example, if the summed signal is a 16-bit signal, the shifter device 910 can select 12 bits based on the number of inputs (e.g., different signals from the number of remote units being summed) and whether the output of the saturate device 908 has clipped. The saturate device 908 can clip signals at a level selected by the shifter device 910. Instead of limiting the output of the summer 902, the maximum signal value allowable can be outputted and the remainder can be clipped. Distortion of the summed signal can be reduced by, for example, avoiding gain reduction on a sample-by-sample basis of the summed signal. If the signal is greater than a maximum level, the saturate device 908 can set the signal to the maximum level. If the signal is less than a minimum level, the saturate device 908 can set the signal to the minimum level.

For example, to minimize the non-linear effects caused by performing sample-by-sample limiting, a limiter can apply the magnitude of the unlimited output of the summer to the input of an averaging circuit. The averaging circuit can have different attack and decay times such that when the signal is increasing in level, the averaging period is shorter, and when the signals is reducing in level, the averaging period is longer. The output of an averager can be used to control the scaling value. This averaging function can allow a slowly changing scaling function to be applied to the sum, minimizing the non-linear effects caused by the changing gain. The averaging circuit can be implemented by several means, including a windowed averager, a peak detector with decay, or an exponential averager.

If complex signals are being processed, then the magnitude of both the real and quadrature components can be input into the averager and the scaling factor can be applied equally to both the real and quadrature paths. The magnitude of a complex signal can be sqrt(I^2+Q^2) or it can be approximated by constant*(|I|+|Q|).

There may be cases when the instantaneous sum of the real and/or quadrature sum is within the allowed resolution, but both signals can still be scaled because the average peak level indicates that the peak levels of the signals will exceed the maximum allowed level.

When using a peak averaging circuit to determine the scaling factor, there may be cases when the signal increases rapidly such that the scaling factor may not reduce the output of the scaling circuit below the maximum allowed level. In this case, a saturate device 908 can be used to limit the signal level. That is, if the scaled output (sum*scale factor) is greater than the maximum allowed value, then the maximum allowed value is used instead of the scaled sum.

This limiter may also allow for fixed scaling of the output. For each input that is added to the sum, the noise floor of the sum can increase. Usually, it is not desirable to reduce the scale of the output because it further increases the noise floor. However, if many signals are summed together, the noise floor can rise quite high, and if the output is scaled, then the additional noise added due to output scaling is negligible.

The sum can be scaled based on the peak average of the signal sum rather than each sum. The attack time and decay time of the average can be different (the averaging period is different). If complex, then the average peak magnitude of the complex signal can be used to scale both the real and quadrature component. If the scaled output exceeds the allowed bit resolution, then the maximum allowed value permitted by the allowed resolution can be used (saturation) and this can be applied to I and Q separately. Individual input signals can be attenuated if they get too close to the maximum allowed level. If complex signals are processed, the input scaling can be applied to each separately. The sum of the unscaled inputs can be calculated or approximated, and a scaling factor for each input determined and applied separately. A fixed scaling can be applied to the output sum.

Figure 12:
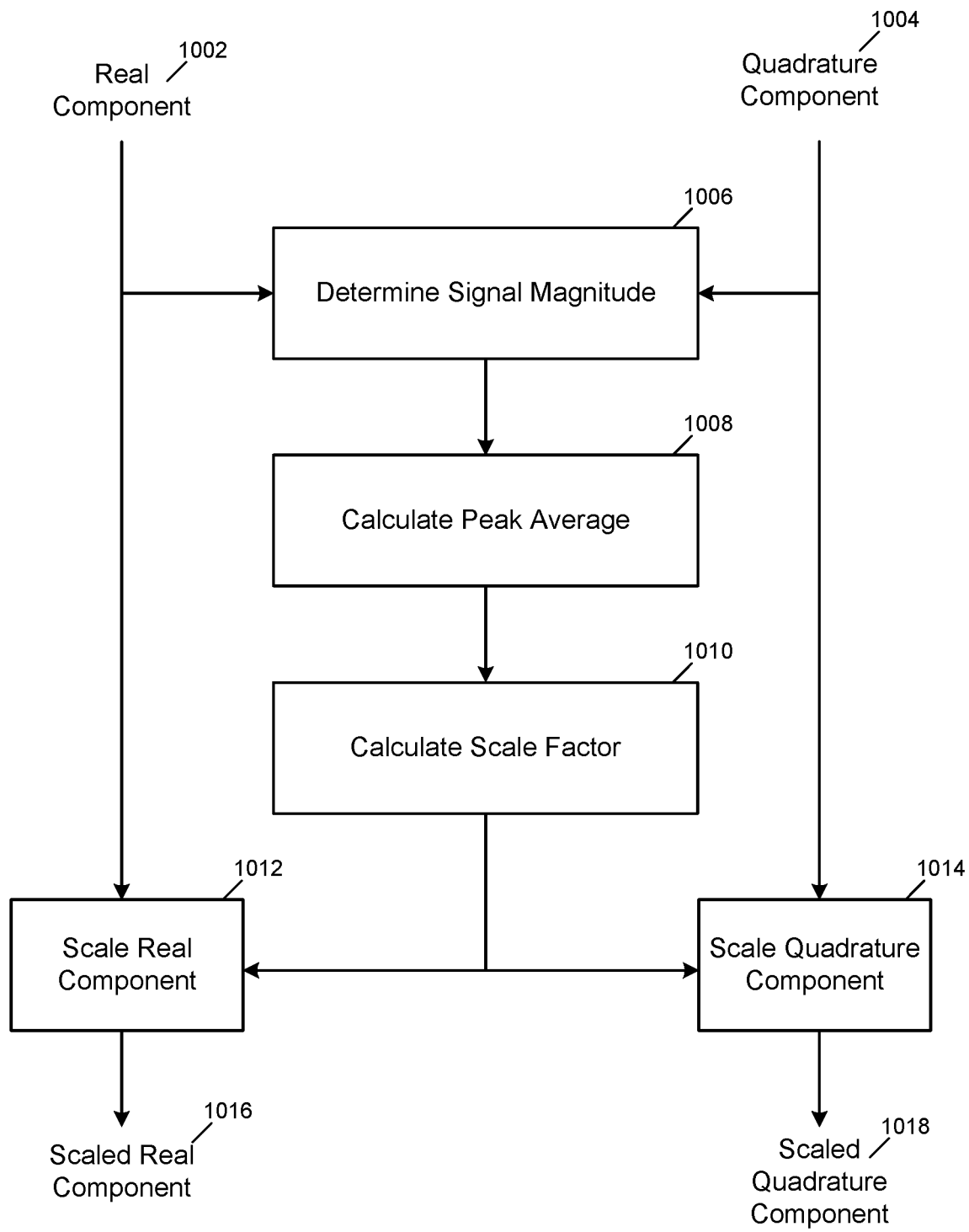
FIG. 12 is a flow diagram of an example process for scaling input signals in a signal processing subsystem.

FIG. 12 is a flow diagram depicting an example process that can be implemented by one of the variable gain blocks 904a-n and an associated one of the signal envelope peak detectors 906a-n for an input signal that includes a real component 1002 and a quadrature component 1004. A signal envelope peak detector can determine the magnitude in block 1006 of the real component 1002 and the quadrature component 1004 according to the following relationship: magnitude=sqrt(I^2+Q^2). The magnitude can include signal voltage, power level, and/or digital signal level.

The signal envelope peak detector can calculate the peak average in block 1010. "a" can control attack time and "b" can control decay time. If the magnitude is greater than the peak average, then the peak average=peak average+a*magnitude. Otherwise, the peak average=b*peak average.

The signal envelope peak detector determines a scale factor in block 1010. If the peak average level is greater than the maximum allowed threshold, the scale factor is the maximum threshold divided by the peak average. Otherwise, the scale factor is one.

The scale factor is applied to each of the real component 1002 and quadrature component Q in 1012 and 1014 to output a scaled real component 1016 and a scaled quadrature component 1018.

Figure 13:
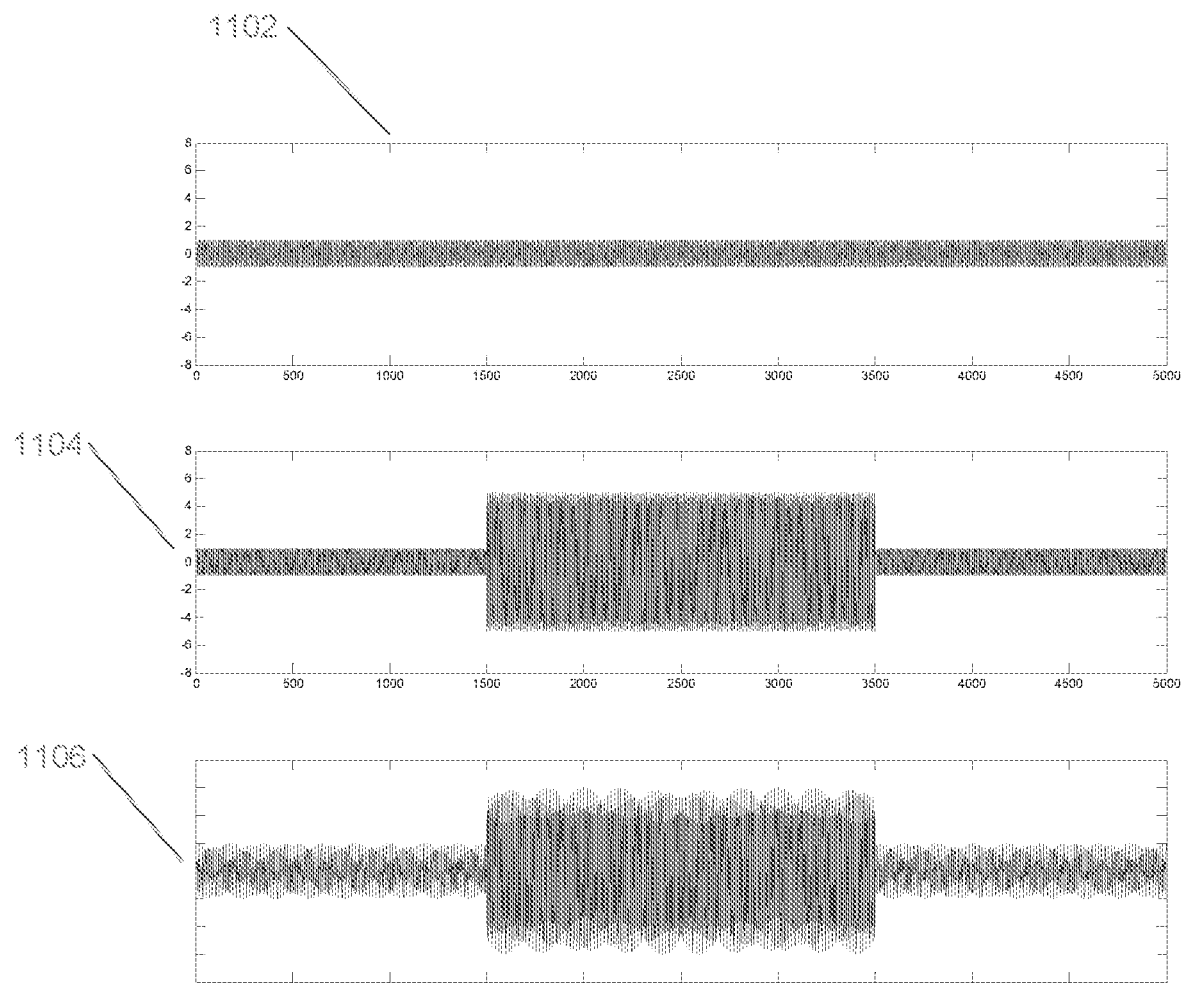
FIGS. 13-20 are signal plot diagrams of example signals in a signal processing subsystem.

FIGS. 13-20 include signal plot diagrams of example signals. FIG. 13 depicts the real component of an input signal A 1102, the real component of an input signal B 1104, and a real component of signal C 1106 (the sum of input signal A 1102 and input signal B 1104). Input signals A 1102 and B 1104 are each a complex sinusoid of the form K*exp(j 2 piIt), where the real part is K*cos(2*pi*f*t) and the quadrature part is K*sin(2*pi*f*t). In the plots, the magnitude of input signal B 1104 increases from 1 to 5 from samples 1500 to 3500, while the magnitude of input signal A 1102 is constant with a value of one. In FIGS. 14-20, each input is scaled to have a maximum level −3<<3 and the output is scaled and limited to be −5<<5. Throughout FIGS. 13-20, only the real component is shown. The quadrature component is not shown, but is similar; it is just shifted in phase.

Figure 14:
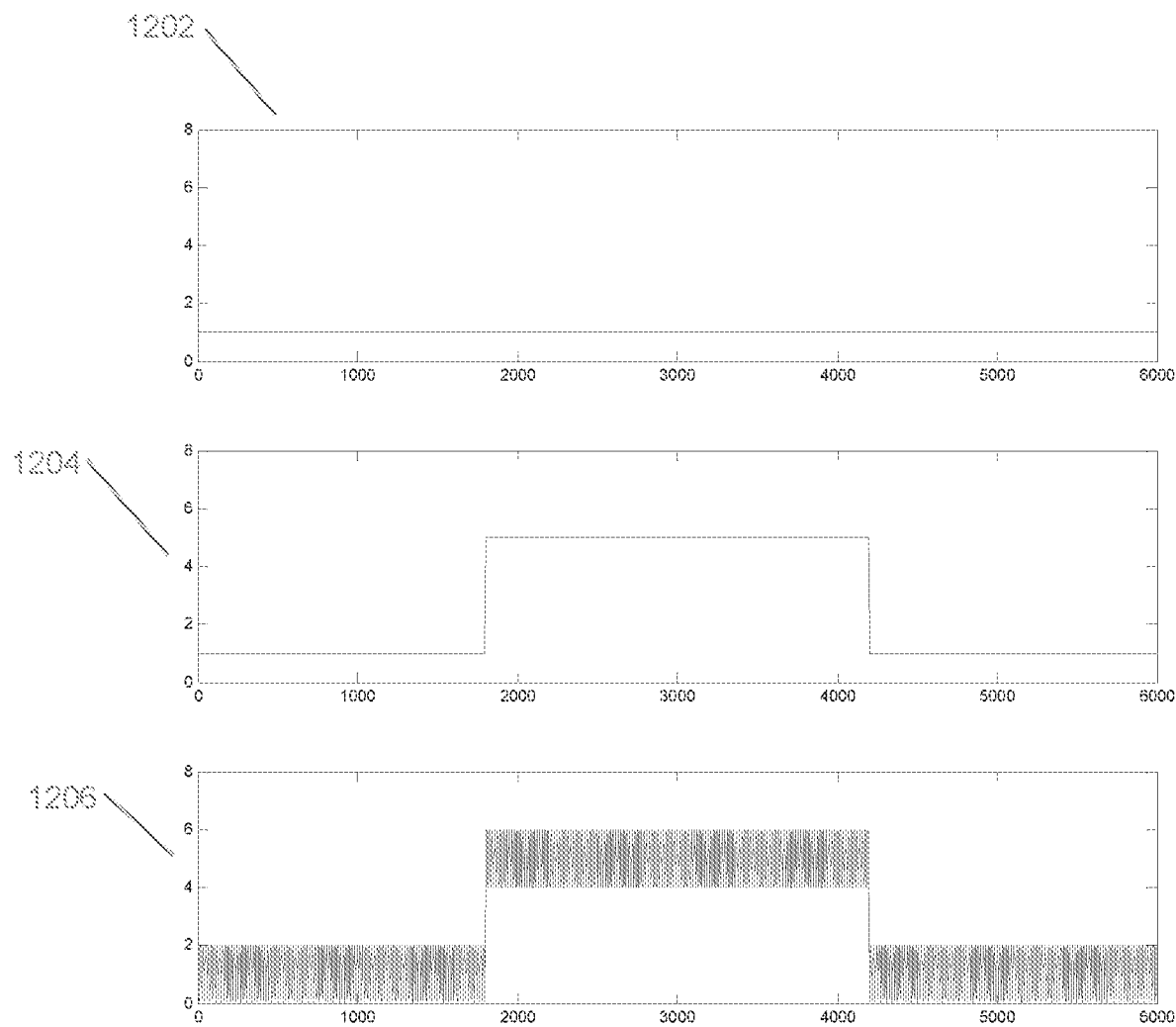

FIG. 14 shows the magnitudes of each of input signal A 1202, input signal B 1204, and summed signal C 1206.

Figure 15:
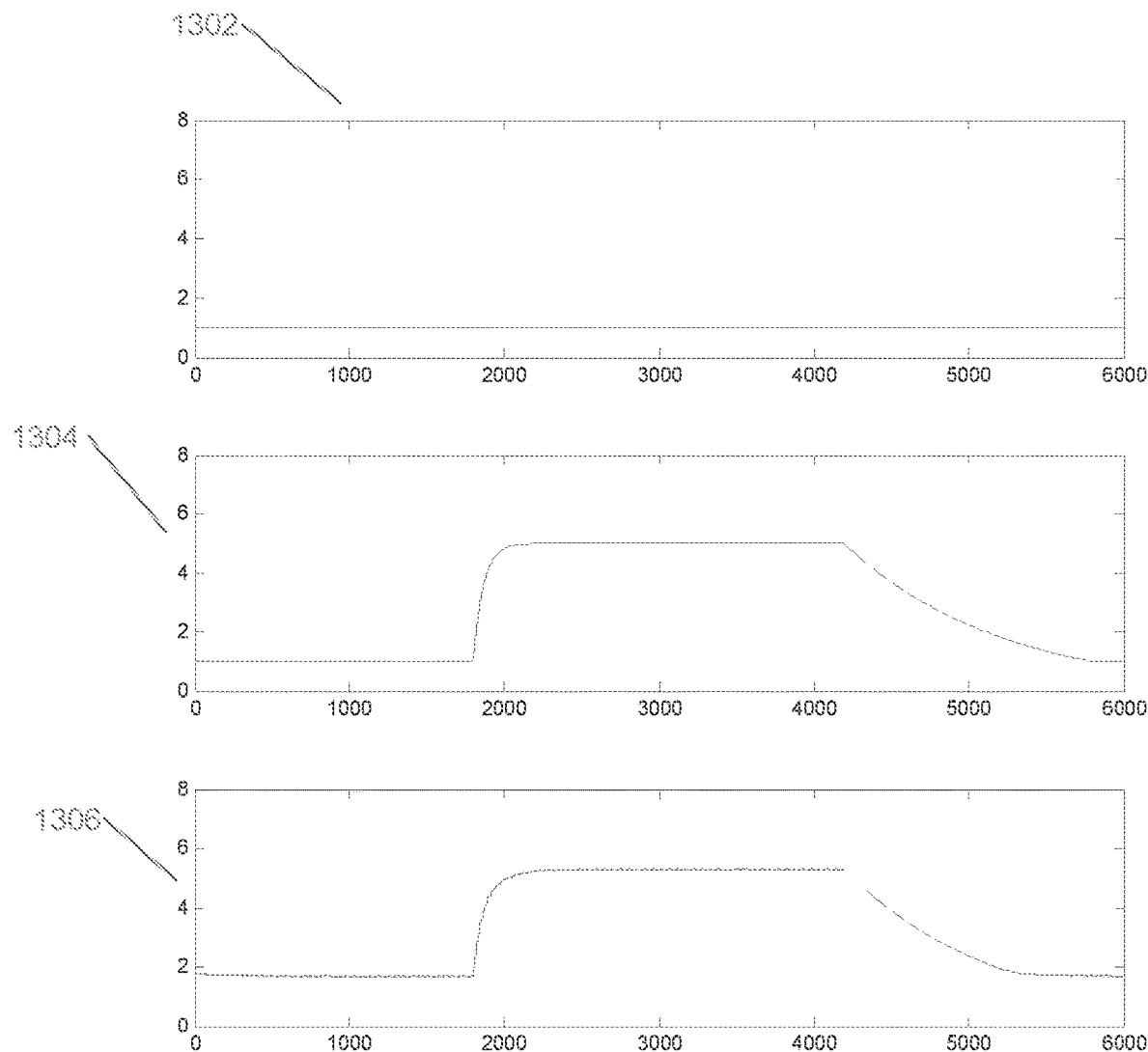

FIG. 15 shows the peak averages of each of input signal A 1302, input signal B 1304, and summed signal C 1306. When input signal B 1104 increases, there is a short amount of time needed for the average peak level of the signal to reach the actual new peak level—this is the attack time of the peak average detector. Likewise, there is a longer time needed for the peak average level to fall back to the new, smaller peak value of B 1304—this is the decay time of the peak average detector.

Figure 16:
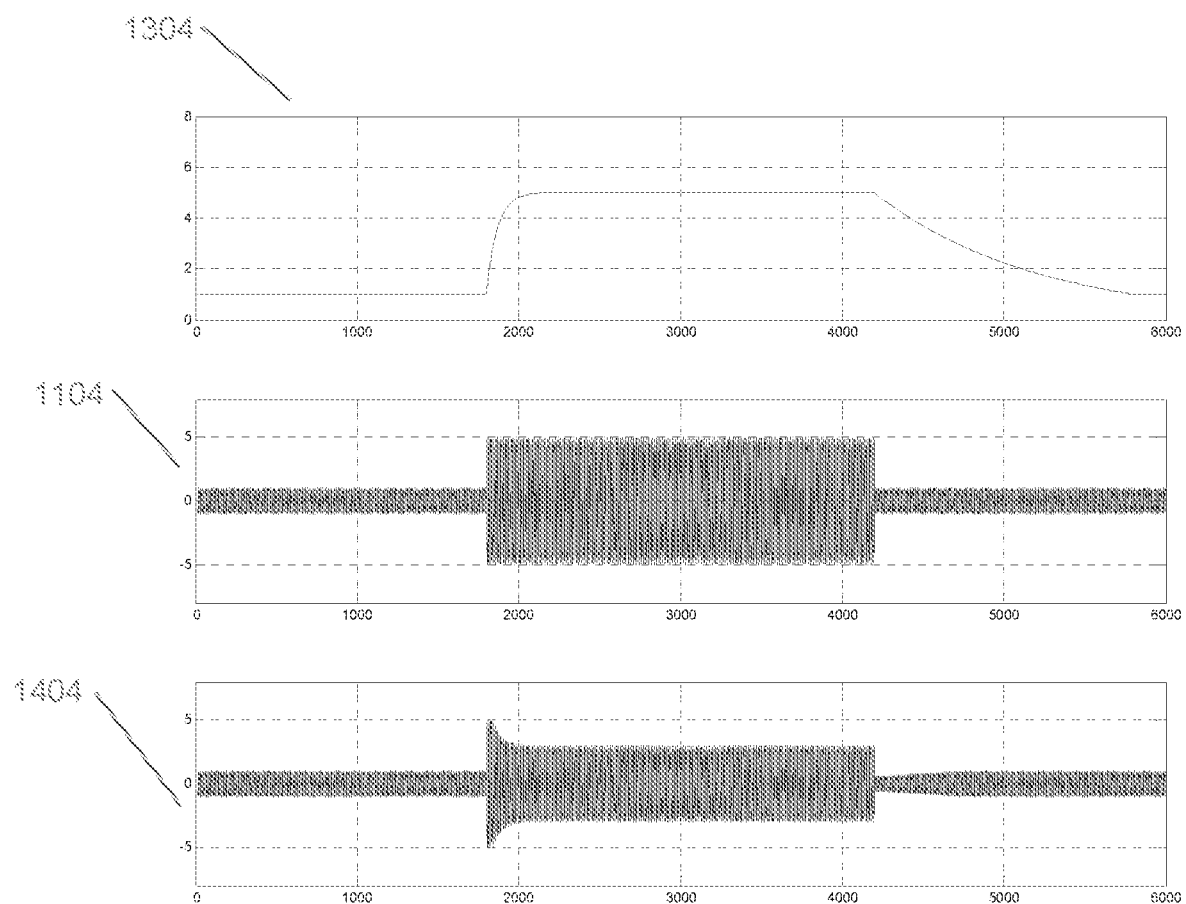

FIG. 16 depicts input signal B 1104 being scaled 1404 by a variable gain block. The top graph is the output of the peak average detector of input signal B 1304. The limited signal is the output of the variable gain block having a gain is set to Max Threshold/Peak Average if Peak Average>Max Threshold, otherwise the gain is set to 1. In this case, the Max Threshold is set to 3. The maximum value of the output of the variable gain block is 3 after the gain has settled after the attack time. The gain returns to 1 after the input signal B 1104 returns to the initial magnitude of 1. The scaled input signal A is not shown because it is identical to the input signal A 1102 because it is below the maximum threshold.

Figure 17:
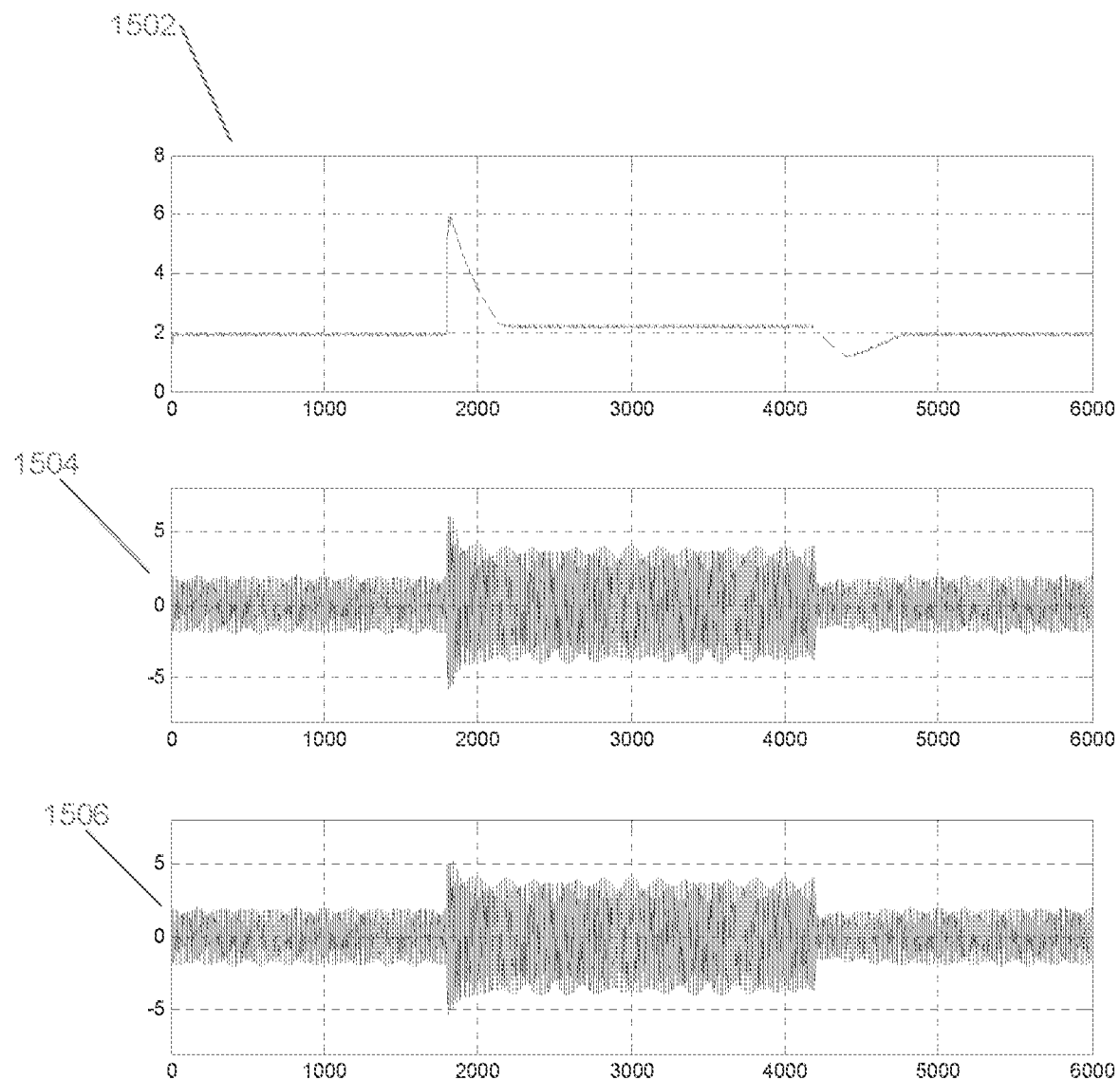

FIG. 17 depicts scaling by the variable gain block on the summed signal C 1504. There is a peak detected, but this time with a faster attack time. A peak value of 6 is detected in the top graph 1502. The maximum threshold of the summed output has been set to 5. There is only a short duration where the magnitude of the signal is greater than 5. In the bottom graph 1506, the output of the variable gain block is shown in which the maximum value has been reduced to be −5<<5.

Figure 18:
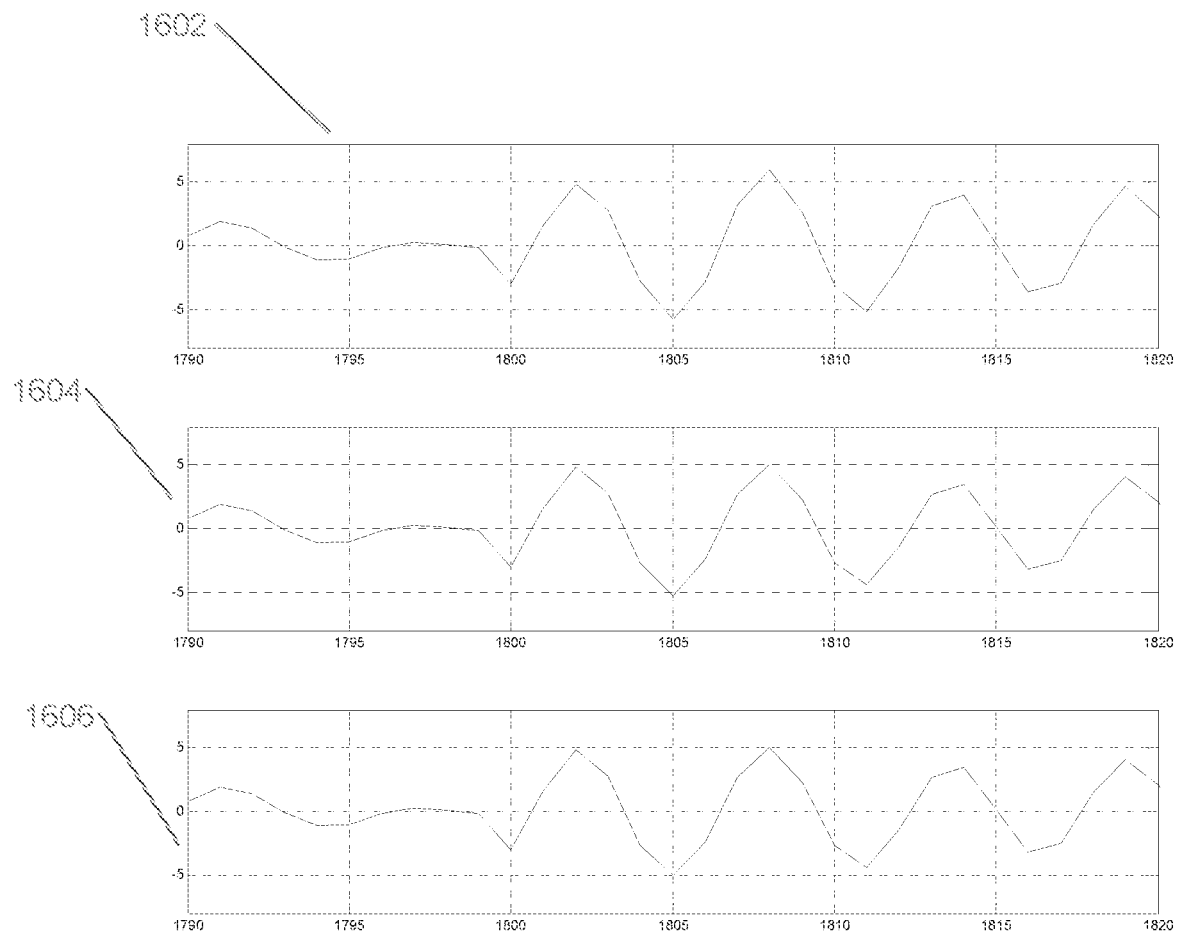

FIG. 18 depicts a close up view of the output of the summer 1602, the output of the variable gain block 1604, and the output of a saturate device 1606. The output of the variable gain block may be within the range +/−5. The saturate device can take care of the few samples that are still outside the range of +/−5. In this case, only samples 1805 and 1808 are outside the range after the scaled signal leaves the variable gain block, and the saturate device forces them to the max/min values of 5/−5.

Figure 19:
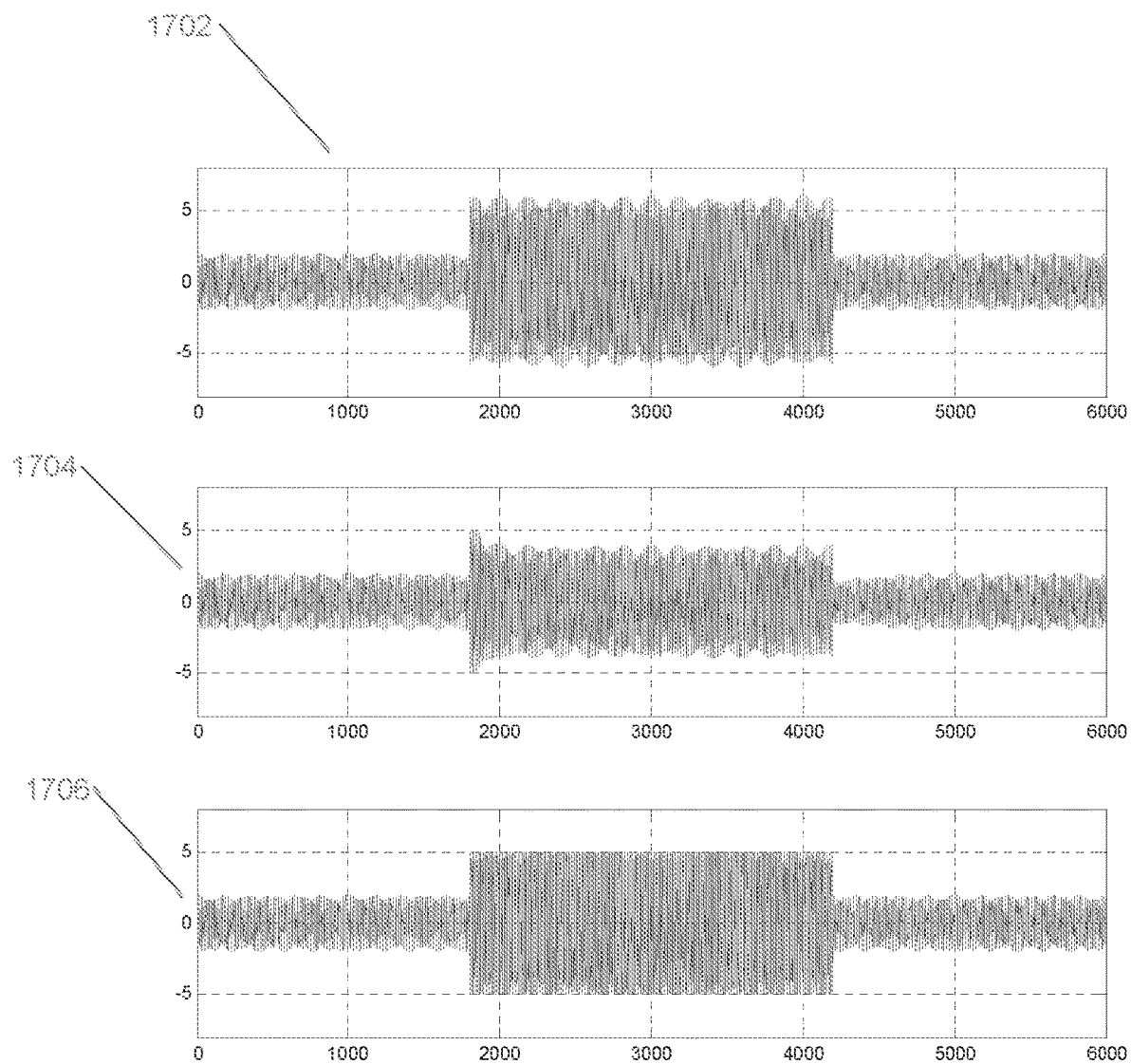

FIG. 19 depicts signals outputted by the adder (i.e., summer), scaler, and saturator (i.e., saturate device). The top chart 1702 is the unlimited sum of the two input signals. The middle chart 1704 is the sum of signals A and B, with the magnitude of B scaled to have a peak average magnitude less than 3, and the final sum scaled to have a peak average magnitude less than 5. The bottom chart 1706 is a simple limiter/saturator with the max value set to +/−5.

Figure 20:
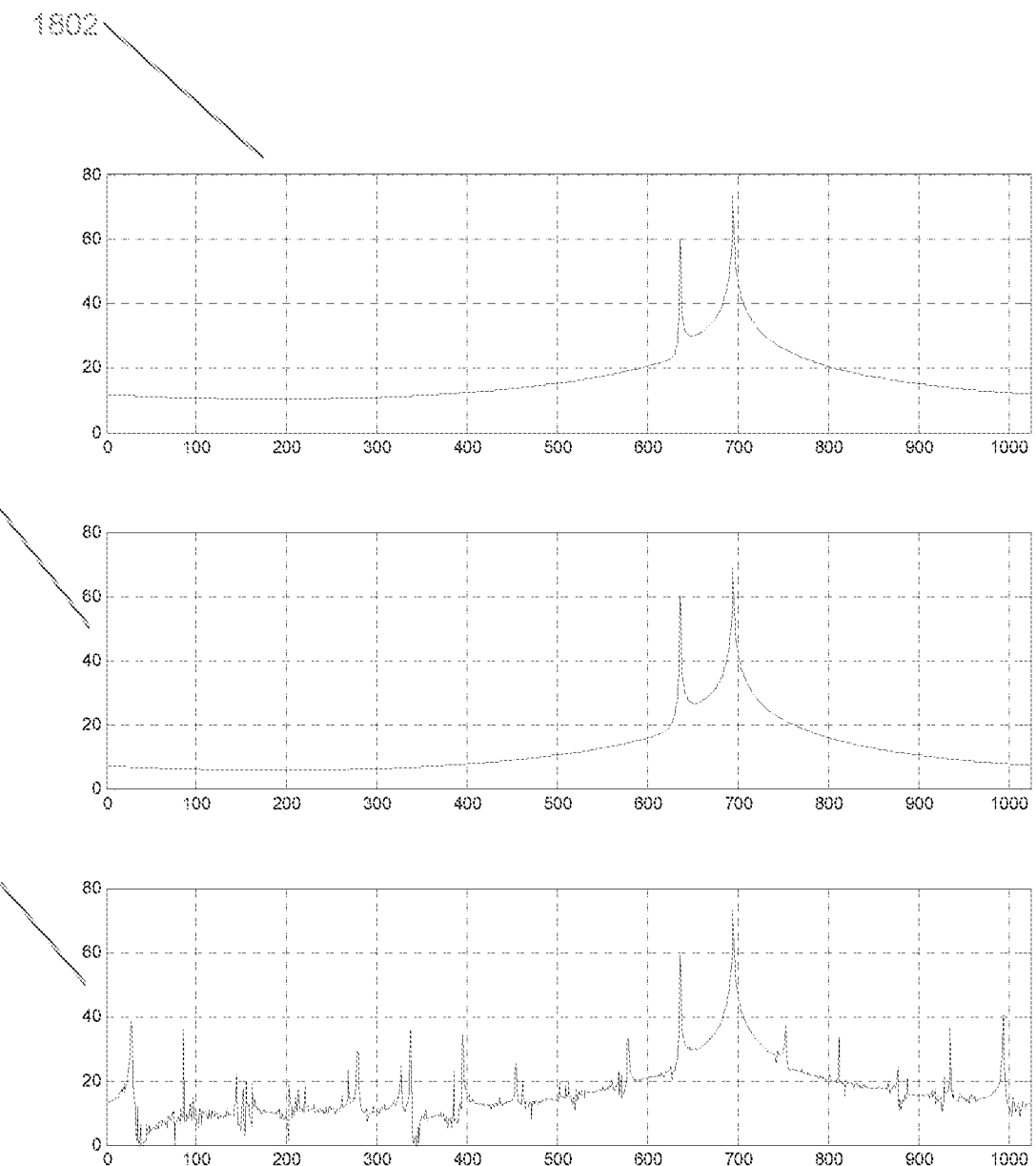

FIG. 20 depicts fast Fourier transforms of signals during the time when the scaling function is active and in a steady state condition, between samples 3000 and 4023 of the previous charts. The difference in performance can be seen when the frequency domain of the combined signals is observed. The top chart 1802 shows the spectrum of the sum of the unscaled signals. The middle chart 1804 shows the output of the summer. Only the higher-level signal B has been attenuated, while the signal A is unchanged. The spectrum does not indicate any appreciable distortion. However, the bottom chart 1806 showing the saturated/clipped signal shows significant distortion throughout the entire spectrum.

The foregoing description of the aspects, including illustrated examples, of the invention has been presented only for the purpose of illustration and description and is not intended to be exhaustive or to limit the invention to the precise forms disclosed. Numerous modifications, adaptations, and uses thereof will be apparent to those skilled in the art without departing from the scope of this invention.

What is claimed is:

1. A method comprising:
receiving downlink signals at a head end unit of a distributed antenna system from at least one base station;
processing the downlink signals into downlink channelized digital baseband signals at the head end unit by at least one of channel filtering, interpolating, and mixing with an oscillator, the downlink channelized digital baseband signals including call information for wireless communication;
formatting the downlink channelized digital baseband signals for transport together at the head end unit;
packetizing and packet scheduling the downlink channelized digital baseband signals into downlink packetized baseband signals at the head end unit; and
transmitting the downlink packetized baseband signals from the head end unit to remotely located units of the distributed antenna system.

2. The method of claim 1, further comprising:
receiving uplink packetized baseband signals from the remotely located units at the head end unit;
extracting uplink channelized digital baseband signals from the uplink packetized baseband signals at the head end unit;
processing the uplink channelized digital baseband signals into uplink signals at the head end unit; and
communicating the uplink signals to the at least one base station from the head end unit.

3. The method of claim 1, further comprising:
receiving uplink packetized baseband signals from the remotely located units at the head end unit;
extracting uplink channelized digital baseband signals from the uplink packetized baseband signals at the head end unit;
processing the uplink channelized digital baseband signals into uplink signals at the head end unit;
summing the uplink signals into a summed uplink signal at the head end unit; and
communicating the summed uplink signal to the at least one base station at the head end unit.

4. The method of claim 3, further comprising:
controlling a gain of each of a plurality of the uplink channelized digital baseband signals at the head end unit.

5. The method of claim 1, further comprising:
interleaving samples from different digital downlink packetized baseband signals into downlink framed digital baseband data streams at the head end unit;
converting the downlink framed digital baseband data streams to a different bit rate at the head end unit;
mapping the downlink framed digital baseband data streams into downlink Ethernet frames at the head end unit; and
communicate the downlink Ethernet frames to the remotely located units from the head end unit.

6. The method of claim 1, further comprising:
processing the downlink signals into downlink channelized digital baseband signals at the head end unit at least in part by performing filtering and signal gain changes on the downlink channelized digital baseband signals.

7. A method comprising:
receiving uplink packetized baseband signals from remotely located units of a distributed antenna system at a head end unit of the distributed antenna system;
extracting uplink channelized digital baseband signals from the uplink packetized baseband signals at the head end unit;
processing the uplink channelized digital baseband signals into uplink signals at the head end unit by at least one of channel filtering, interpolating, and mixing with an oscillator, the uplink channelized digital baseband signals including call information for wireless communication; and communicating at least one of the uplink signals and a summation of the uplink signals from the head end unit to at least one base station.

8. The method of claim 7, further comprising:
receiving downlink signals from at least one base station at the head end unit;
processing the downlink signals into downlink channelized digital baseband signals at the head end unit;
formatting the downlink channelized digital baseband signals for transport together at the head end unit;
packetizing and packet scheduling the downlink channelized digital baseband signals into downlink packetized baseband signals at the head end unit; and
transmitting the downlink packetized baseband signals from the head end unit to the remotely located units.

9. The method of claim 7, further comprising:
communicating at least one of the uplink signals and a summation of the uplink signals from the head end unit to the at least one base station by being configured to communicate at least one of the uplink signals and a summation of the uplink signals to the at least one base station by being configured to communicate the uplink signals to the at least one base station.

10. The method of claim 7, further comprising:
summing the uplink signals into a summed uplink signal at the head end unit; and
communicating at least one of the uplink signals and a summation of the uplink signals from the head end unit to the at least one base station by being configured to communicate the summed uplink signal to the at least one base station.

11. The method of claim 7, further comprising:
controlling a gain of each of a plurality of the uplink channelized digital baseband signals at the head end unit;
summing the uplink signals into a summed uplink signal at the head end unit; and
communicating at least one of the uplink signals and a summation of the uplink signals to the at least one base station at the head end unit by being configured to communicate the summed uplink signal to the at least one base station.

12. The method of claim 7, further comprising:
receiving uplink Ethernet frames from remotely located units at the head end unit;
extracting uplink digital baseband data stream frames from the uplink Ethernet frames at the head end unit;
converting the uplink digital baseband data stream frames to a different bit rate at the head end unit; and
extracting digital uplink packetized baseband signals from the uplink digital baseband data stream frames at the head end unit.

13. A method comprising:
extracting received channelized digital baseband signals received from at least two remote units within a distributed antenna system configured to wirelessly transmit signals in a coverage area;
formatting channelized digital baseband signals for transport together;
packetizing and packet scheduling the channelized digital baseband signals; and
processing the channelized digital baseband signals by at least one of channel filtering, interpolating, and mixing using an oscillator.

14. The method of claim 13, wherein extracting, formatting, packetizing and packet scheduling, and processing occur at a head end unit within the distributed antenna system.

15. The method of claim 13, wherein extracting, formatting, packetizing and packet scheduling, and processing occur in at least one of the at least two remote units within the distributed antenna system.

16. The method of claim 13, further comprising:
controlling a gain of each of a plurality of uplink digital baseband signals received from the at least two remote units independently prior to summing the plurality of uplink digital baseband signals.

17. The method of claim 16, wherein controlling occurs at an extension unit between a head end unit and the at least two remote units of the distributed antenna system.

18. The method of claim 16, further comprising:
determining a signal magnitude of an uplink digital baseband signal from a remote unit;
determining a peak average based on the signal magnitude;
determining a scale factor based on the peak average; and
scaling the uplink digital baseband signal using the scale factor.

19. The method of claim 13, further comprising:
digitally up-converting received digital baseband signals to produce received digital signals; and
summing the received digital signals to produce summed digital signals to be converted to analog signals.

20. The method of claim 13, further comprising:
interleaving samples from different digital baseband data streams into frames;
extracting digital baseband data streams from frames;
converting framed digital baseband data streams to a different bit rate;
mapping the framed digital baseband data streams into Ethernet frames;
extracting digital baseband data stream frames from received Ethernet frames; and
communicating signals using a transport physical interface device.

\* \* \* \* \*